(12) United States Patent
Ghosh

(10) Patent No.: US 10,192,229 B2
(45) Date of Patent: Jan. 29, 2019

(54) SYSTEMS AND METHODS FOR CONTROLLING ACCESS TO LOCATION BASED DATA

(71) Applicant: MasterCard International Incorporated, Purchase, NY (US)

(72) Inventor: Debashis Ghosh, Charlotte, NC (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 24 days.

(21) Appl. No.: 14/846,175

(22) Filed: Sep. 4, 2015

(65) Prior Publication Data

US 2016/0337332 A1 Nov. 17, 2016

Related U.S. Application Data

(60) Provisional application No. 62/162,214, filed on May 15, 2015.

(51) Int. Cl.
| | |
|---|---|
| H04L 29/00 | (2006.01) |
| G06F 17/30 | (2006.01) |
| G06F 21/00 | (2013.01) |
| G06Q 30/02 | (2012.01) |
| G06Q 10/06 | (2012.01) |
| H04L 29/06 | (2006.01) |
| H04L 29/08 | (2006.01) |
| G06Q 10/00 | (2012.01) |

(52) U.S. Cl.
CPC ... *G06Q 30/0205* (2013.01); *G06F 17/30241* (2013.01); *G06Q 10/00* (2013.01); *G06Q 10/06393* (2013.01); *H04L 63/083* (2013.01); *H04L 63/102* (2013.01); *H04L 67/18* (2013.01)

(58) Field of Classification Search
CPC .......................... H04L 63/10; G06Q 30/0205
USPC ....................... 705/7.34; 726/2–4, 26, 27, 28
See application file for complete search history.

(56) References Cited

U.S. PATENT DOCUMENTS

| | | |
|---|---|---|
| 7,181,445 B2 | 2/2007 | Bebo et al. |
| 8,055,578 B1 | 11/2011 | Hallman |

(Continued)

OTHER PUBLICATIONS

International Search Report and Written Opinion for International Application No. PCT/US2016/031758, dated Jun. 29, 2016, pp. 1-12.

(Continued)

*Primary Examiner* — Alexander Lagor
(74) *Attorney, Agent, or Firm* — Armstrong Teasdale LLP

(57) ABSTRACT

A method for controlling access to data displayed by an information services portal on a user device is provided. The method includes receiving a candidate login input corresponding to a user. The method further includes comparing the candidate login input to a list of login entries stored in the memory, each of the stored login entries having a corresponding code segment, each code segment defining a bounding area defining a geographic area. The method further includes retrieving from the memory a selected code segment corresponding to the stored login entry matching the candidate login input, and applying a geographic restriction to the data set by processing the selected code segment. The method further includes transmitting a data subset of the data set to the user computing device for display, the data subset including data satisfying the geographic restriction.

18 Claims, 10 Drawing Sheets

(56) References Cited

U.S. PATENT DOCUMENTS

| | | | |
|---|---|---|---|
| 8,195,500 B2 | 6/2012 | Tavares et al. | |
| 8,306,846 B2 | 11/2012 | Tavares et al. | |
| 8,417,561 B2 | 4/2013 | Ghosh et al. | |
| 8,438,310 B2 | 5/2013 | Muilenburg et al. | |
| 8,640,099 B1 * | 1/2014 | McGilliard | G06Q 10/063 717/121 |
| 8,781,874 B2 | 7/2014 | Tavares et al. | |
| 2007/0100680 A1 | 5/2007 | Kumar et al. | |
| 2007/0192347 A1 | 8/2007 | Rossmark et al. | |
| 2008/0033587 A1 | 2/2008 | Kurita et al. | |
| 2009/0055242 A1 | 2/2009 | Rewari et al. | |
| 2009/0132316 A1 * | 5/2009 | Florance | G06Q 30/06 701/532 |
| 2011/0082718 A1 | 4/2011 | Ghosh et al. | |
| 2011/0178844 A1 | 7/2011 | Rane et al. | |
| 2011/0264581 A1 | 10/2011 | Clyne | |
| 2011/0270705 A1 | 11/2011 | Parker | |
| 2012/0084117 A1 | 4/2012 | Tavares et al. | |
| 2012/0124496 A1 | 5/2012 | Rose et al. | |
| 2012/0233090 A1 | 9/2012 | Tavares et al. | |
| 2012/0296724 A1 | 11/2012 | Faro et al. | |
| 2012/0303425 A1 | 11/2012 | Katzin et al. | |
| 2012/0311475 A1 | 12/2012 | Wong et al. | |
| 2013/0073464 A1 | 3/2013 | Magpayo et al. | |
| 2013/0124263 A1 | 5/2013 | Amaro et al. | |
| 2014/0229323 A1 | 8/2014 | Or et al. | |
| 2014/0278744 A1 | 9/2014 | Lo Faro et al. | |
| 2014/0372338 A1 | 12/2014 | Kim et al. | |
| 2015/0012303 A1 | 1/2015 | Ghosh | |
| 2015/0032565 A1 | 1/2015 | Weis et al. | |
| 2015/0058088 A1 | 2/2015 | Unser et al. | |
| 2015/0073977 A1 | 3/2015 | Ghosh et al. | |
| 2015/0134420 A1 | 5/2015 | Unser et al. | |
| 2015/0161705 A1 | 6/2015 | Chauhan et al. | |
| 2015/0186910 A1 | 7/2015 | Cruickshank et al. | |

OTHER PUBLICATIONS

International Search Report and Written Opinion for International Application No. PCT/US2016/031759, dated Jun. 29, 2016, pp. 1-12.

International Search Report and Written Opinion for International Application No. PCT/US2016/031764, dated Jun. 29, 2016, pp. 1-12.

* cited by examiner

SYSTEMS AND METHODS FOR CONTROLLING ACCESS TO LOCATION BASED DATA

CROSS REFERENCE TO RELATED APPLICATIONS

This application claims the benefit of U.S. Provisional Application No. 62/162,214, filed May 15, 2015, which is hereby incorporated by reference in its entirety.

BACKGROUND OF THE DISCLOSURE

The field of the disclosure relates to data access control, and, more specifically, to network-based methods and systems for controlling access to location based data stored within a memory, wherein the data relates to the geographic location of an item.

Data aggregators gather data, store data in memory, and provide the data to consumers of such data. In many cases, these consumers pay for access to this data. In other words, a consumer of data may register with the aggregator and pay for access to such data. The consumer may access the data by logging into a portal or website that allows access to the data. Individual consumers may not have access to all the data stored in the memory. Rather, individual consumers may have access to a subset of the data and pay to access just the subset. The aggregator can grant access to a first set of data to a first consumer and grant access to a second set of data to a second consumer. It may be beneficial to control access such that individual consumers are only provided with access to data for which the individual consumer is paying. In some cases, data may relate to an item or items located in a geographic region. Some consumers may want to access data based on the geographic region in which the item is located. It may be beneficial to control access to data based on the geographic region in which an item, to which the data relates, is located.

BRIEF DESCRIPTION OF THE DISCLOSURE

In one aspect, a method for controlling access by a user computing device to a data set stored in a memory is provided. The data set includes values for a plurality of geographic sectors, and the method is implemented by an access control computing device including at least one processor in communication with the memory. The access control computing device is in further communication with the user computing device. The method includes receiving a candidate login input corresponding to a user, and comparing the candidate login input to a list of login entries stored in the memory, each of the stored login entries having a corresponding code segment, each code segment defining a bounding area defining a geographic area. The method further includes retrieving from the memory a selected code segment corresponding to the stored login entry matching the candidate login input. The method further includes applying a geographic restriction to the data set by processing the selected code segment, and transmitting a data subset of the data set to the user computing device for display, the data subset including data satisfying the geographic restriction.

In another aspect, an access control computing device for controlling access by a user computing device to a data set stored in a memory includes at least one processor in communication with the memory. The data set includes values for a plurality of geographic sectors. The access control computing device is in communication with the user computing device. The at least one processor is programmed to receive a candidate login input corresponding to a user, and compare the candidate login input to a list of login entries stored in the memory, each of the stored login entries having a corresponding code segment, each code segment defining a bounding area defining a geographic area. The at least one processor is further programmed to retrieve from the memory a selected code segment corresponding to the stored login entry matching the candidate login input, and apply a geographic restriction to the data set by processing the selected code segment. The at least one processor is further programmed to transmit a data subset of the data set to the user computing device for display, the data subset including data satisfying the geographic restriction.

In a further aspect, a computer-readable storage medium having computer-executable instructions embodied thereon for controlling access by a user computing device to a data set stored in a memory is provided. The data set includes values for a plurality of geographic sectors. When said computer-executable instructions are executed by an access control computing device including at least one processor in communication with the memory, the computer-executable instructions cause the access control computing device to receive a candidate login input corresponding to a user. The computer-executable instructions further cause the access control computing device to compare the candidate login input to a list of login entries stored in the memory, each of the stored login entries having a corresponding code segment, each code segment defining a bounding area defining a geographic area. The computer-executable instructions further cause the access control computing device to retrieve from the memory a selected code segment corresponding to the stored login entry matching the candidate login input, and apply a geographic restriction to the data set by processing the selected code segment. The computer-executable instructions further cause the access control computing device to and transmit a data subset of the data set to the user computing device for display, the data subset including data satisfying the geographic restriction.

BRIEF DESCRIPTION OF THE DRAWINGS

FIG. 1 is a schematic diagram illustrating an example multi-party payment card system for enabling payment-by-card transactions, generating aggregated merchant analytics, and providing data access control in accordance with one embodiment of the present disclosure.

FIG. 2 is an expanded block diagram of an example embodiment of a computer system used in controlling data access that includes an access control computing device in accordance with one example embodiment of the present disclosure.

FIG. 3 illustrates an example configuration of a server system such as the access control computing device of FIG. 2.

FIG. 4 illustrates an example configuration of a client system shown in FIG. 2.

FIG. 5 is a simplified data flow diagram for data access control using the access control computing device of FIG. 2.

FIG. 6 is a simplified diagram of an example method for data access control using the access control computing device of FIG. 2.

FIG. 7 is a diagram of components of one or more example computing devices that may be used in the environment shown in FIG. 2.

FIG. 8 is an example screenshot displayed on a user interface of a remote computing device, including a bounding area for selecting a geographic region for which data will be accessible.

FIGS. 9-10 are example screenshots displayed on a user interface of a user computing device, including data to which access has been provided by the access control computing device of FIG. 2.

Figure 1:
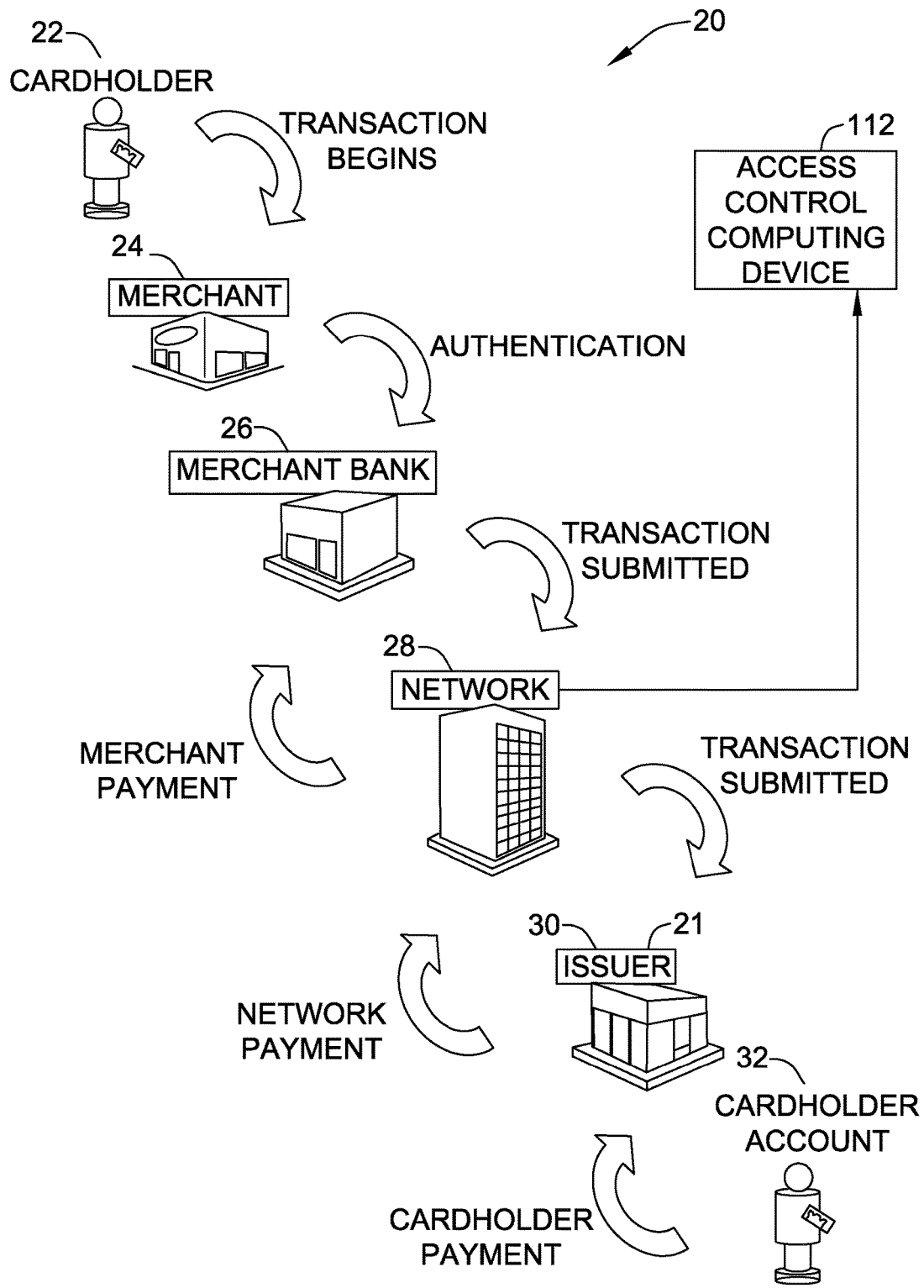
FIGS. 1-10 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION OF THE INVENTION

The systems and methods described herein facilitate data access control for location based data including values for a plurality of geographic regions. The system described herein (i) receives a candidate login input corresponding to a user; (ii) compares the candidate login input to a list of login entries stored in a memory, each of the stored login entries having a corresponding code segment, each code segment defining a bounding area defining a geographic area; (iii) retrieves from the memory a selected code segment corresponding to the stored login entry matching the candidate login input; (iv) applies a geographic restriction to the data set by processing the selected code segment; and (v) transmits a data subset of the data set to the user computing device for display, the data subset including data satisfying the geographic restriction. The data set may, for example, include aggregated merchant analytics for each geographic sector directed toward five key characteristics of a merchant or a sector including multiple merchants: growth, stability, size, traffic, and ticket size (and a composite or aggregation of those characteristics).

The systems and methods described herein are implemented by a special purpose computing device that may be referred to as an "access control computing device." The access control computing device includes a processor in communication with a memory. The access control computing device is configured to: (i) receive a candidate login input corresponding to a user; (ii) compare the candidate login input to a list of login entries stored in the memory, each of the stored login entries having a corresponding code segment, each code segment defining a bounding area defining a geographic area; (iii) retrieve from the memory a selected code segment corresponding to the stored login entry matching the candidate login input; (iv) apply a geographic restriction to the data set by processing the selected code segment; and (v) transmit a data subset of the data set to the user computing device for display, the data subset including data satisfying the geographic restriction.

Generally, the access control computing device controls access to information which corresponds to a plurality of geographic regions or sectors. This allows an operator of the access control computing device to selectively provide access to data for specific areas. For example, the access control computing device can be used to provide access to data relating to an item or items located in a single state to one user and a different single state to a second user. Exclusive access to data for different areas can be provided. In other embodiments, access to data for a particular region may not be exclusive. The access control computing device also allows for a particular area of interest to be specified such that a user receives substantially only data for the area in which the user is interested. As used herein, "item" can mean a piece of property or a business such as a "brick and mortar" type store or other business located in a geographic area.

In a Data Generation Phase described herein, the access control computing device generates or receives the data for which access is controlled. For example, this data may be merchant analytics data determined based on payment card transactions for merchants within particular sectors (e.g., census blocks, cities, counties, states, etc.). The merchant analytics may be aggregated to provide information such as the average transaction amount for a merchant within a sector, average transaction volume for a merchant within a sector, and/or other analytics as described herein.

In an Enrollment Phase described herein, a user is enrolled with the access control computing device such that the user can access the data generated in the Data Generation Phase. This includes providing the access control computing device with login information which includes a definition of the geographic area for which the user desires access to the corresponding data. This definition may be in the form of a code segment which defines a bounding area (e.g., a bounding box) encompassing a portion of a map. The access control computing device stores the login information in a login information database such that when a user logs in to an information services portal via a user device and is granted access to the portal via the access control computing device, the code segment may be used to control the user's access to the information generated in the Data Generation Phase.

In a Login Phase described herein, the access control computing device receives candidate login information from a user as a candidate login input. The access control computing device compares that candidate login information (e.g., candidate login input) to a list of login information (e.g., login entries) to retrieve a code segment corresponding to the user logging into the information services portal. The code segment is used by the access control computing device to limit the display of information to the user to just the geographic area the user defined or selected in the Enrollment Phase. The code segment is used to apply a geographic restriction to the information which can be displayed or transmitted to the user.

In a Data Display Phase described herein, the access control computing device uses the code segment selected in the Login Phase to select the data which is to be displayed to the user via the information services portal and on a user device. The access control computing device compares the geographic area defined by the code segment to the location of the sectors for which data was generated in the Data Generation Phase and retrieves data for only those sectors located in the area defined by the code segment. The sector and accompanying data is displayed to the user.

Data Generation Phase

In a Data Generation Phase, data is generated for which access is controlled by the access control computing device. In one embodiment, the access control computing device receives the data for which access is controlled from another computing device such as a merchant analytics computing device. The merchant analytics computing device generates merchant analytics for geographic sectors based on transaction data corresponding to merchants located in each geographic sector. As used herein, "transaction data" may include transaction amounts, merchant identifiers, account identifiers, associated time and date stamps, and data descriptive of the product(s) and/or services purchased through financial transactions initiated by a cardholder using a payment card associated with a transaction processing network. In an alternative embodiment, the access control computing device may generate the data to which it controls access. The access control computing device may perform the same functions as a merchant analytics computing device and further control access to the data which is generated (e.g., by a merchant analytics computing device or by the access control computing device itself) in the Data Generation Phase. Although the access control computing device may be configured to control access to data generated or stored on another computing device, the application will describe the access control computing device generating and/or storing the data that it then controls access to. This is for explanatory purposes and is not intended to limit the scope of the disclosure.

The access control computing device is configured to define a plurality of "geographic sectors," or "sectors" (used interchangeably herein). More specifically, the access control computing device is configured to divide up a geographic region (e.g., a country, state, city, county, etc.) into a plurality of sectors containing merchants therein (i.e., a subset of a plurality of merchants located within the geographic region). The sector may be defined by a geographic boundary containing the plurality of merchants therein. In an example embodiment, sectors are defined according to census blocks, and the geographic boundaries of a sector correspond to the geographic boundaries of the census block.

As described above, sectors may be defined on a geographic scale as small as a census block (which may be as small as a city block). However, sectors at the census block level may be "rolled up" or aggregated into larger, block-group level sectors, which may correspond to block groups as defined by the United States Census Bureau. Block-group level sectors may be rolled up or aggregated into large sectors, such as city- or county-level sectors, which themselves may be rolled up or aggregated into state- or nation-level sectors. The (geographic) size of the sectors may depend, in an example embodiment, on a user's view of a map on an interactive user interface, the map displaying the defined sectors.

As will be described further herein, the access control computing device is configured to determine "aggregated merchant analytics" for each sector based at least in part on received transaction data for the merchants located in the sector. The merchant analytics are indicative of the financial success of the sector relative to other sectors in that geographic region. For example, the access control computing device may rank or score a sector relative to other sectors in a county or in a state. In one example embodiment, the access control computing device is configured to determine and provide merchant analytics, which may include a numerical score, for a sector based on aggregated merchant analytics for individual merchants located within the sector.

The access control computing device may define or establish the sectors before receiving the transaction data used to determine the merchant analytics. For example, the access control computing device may use available public information (e.g., census data) to define sectors. The definition of each sector may include geographic coordinates which define each sector. These coordinates may be retrieved from another computing device and/or database. For example, each sector may be a census block and geographic coordinates defining each census block may be retrieved from a remote database defining each census block by at least a pair of geographic coordinates. For example, each sector (e.g., census block) may be defined at least in part by a latitude and a longitude at the center of or otherwise contained in the sector.

In one embodiment, the access control computing device queries a database of census blocks containing at least an identifier of each census block, a range of addresses included within the census block, and geographic coordinates of the census block. The database returns at least the geographic coordinates of the census block, which the access control computing device adds to the definition of the sector. For example, when populating a sector or assigning merchants to a sector, the access control computing device retrieves a merchant address from received transaction data and queries the database using the merchant address. The access control computing device receives in response at least the census block (e.g., sector) and the geographic coordinates defining the sector. The access control computing device stores the merchant in a database along with the corresponding sector and coordinates defining the sector for use in generating merchant analytics for the sector.

The access control computing device may store transaction data, defined sectors, and/or merchant analytics (aggregated and/or individual) in a database. Each merchant for which associated transaction data and/or scores are stored may be indexed or identified in the database by at least one sector identifier and/or by merchant industry. Accordingly, the access control computing device may be configured to not only provide analytics for sectors, but may also be configured to provide analytics for particular industries and/or for particular merchants within that industry.

Merchant and/or transaction data may be indexed by, assigned to, or otherwise associated with a sector based on an address or other location information included in the transaction data. The transaction data is then assigned, by the access control computing device receiving the transaction data, one or more sector identifiers. The address may be included in the transaction data or alternatively may be retrieved from a database of merchants based on a merchant identifier included in the transaction data.

Based on the merchant location information, either included in the transaction data or determined based on the transaction data, the access control computing device may associate the transaction with a corresponding sector that encompasses the merchant location. As previously explained, each sector is also associated with geographic coordinates. In some embodiments, each transaction is analyzed to determine the corresponding sector based on merchant location information. In alternative embodiments, once a merchant has been assigned to a sector by the access control computing device, all transaction data associated with that merchant is automatically associated with the sector corresponding to the merchant. To associate transaction data with a sector, the access control computing device may store the transaction data and the corresponding sector (e.g., identified based on merchant location information as described above) as a tuple, with or without additional information, in a database. The access control computing device may assign a sector identifier to the transaction data and/or the merchant based on the definition of the sector(s) and whether or not the sector(s) encompass the merchant location. The database may be local to the access control computing device. The database may be located remote from the access control computing device and accessed by the access control computing device via a network connection to a device storing the database.

In an example embodiment, the access control computing device generates analytics (e.g., a score) associated with a merchant or a sector. The access control computing device is configured to generate the analytics based on received transaction data associated with the merchant or sector. Merchant identifiers may include an identifier of the merchant at which the transaction was initiated and/or an identifier of the physical location (e.g., a street address, geographic coordinates, etc.) of the merchant. In the example embodiment, the access control computing device receives transaction data from a payment processor integral to or associated with a payment processing network. In some embodiments, the transaction data is anonymized and aggregated by merchant prior to receipt by the access control computing device (i.e., no personally identifiable information (PII) is received by the access control computing device). In other embodiments, the access control computing device may be configured to receive transaction data that is not yet anonymized and/or aggregated, and thus may be configured to anonymize and aggregate the transaction data. In such embodiments, any PII received by the access control computing device is received and processed in an encrypted format, or is received with the consent of the individual with which the PII is associated.

The access control computing device may generate multiple merchant analytics for each merchant and may generate "aggregated merchant analytics" for each sector (i.e., aggregation of the merchant analytics generated for each merchant located in the sector). For example, the "merchant analytics" may include at least one of a growth score, a stability score, a size score, a ticket size score, a traffic score, and a composite score for each sector. A "growth score" is a ranking of the growth of the sector relative to other sectors in the geographic region, wherein "growth" refers generally to sales revenue growth over a period of time. A "stability score" is a ranking of the stability of the sector, wherein "stability" refers generally to a maintenance of sales revenue within a range of sales revenues around an average. A "size score" is a ranking of the size of the sector, wherein "size" refers generally to total sales revenue. A "traffic score" is a ranking of the traffic of the sector, wherein "traffic" refers generally to a number of monthly transactions. A "ticket size score" is a ranking of the ticket size of the sector, wherein "ticket size" refers generally to a transaction amount, and may be calculated by dividing the size by the traffic (i.e., dividing sales revenue by the number of transactions). A "composite score" is a composite of the previous five scores (growth, stability, size, traffic, and ticket size), to provide an overall ranking of the sector. Where the general term "score" without a modifier is used herein, it may refer collectively to any or all of the preceding scores to describe characteristics shared by some or all of the scores. Each of these scores (collectively "analytics") may be generated for each merchant within a sector and may be subsequently aggregated to generate aggregated merchant analytics for the sector.

In one embodiment, the access control computing device may determine a growth score for a merchant using the received transaction data over a time period (e.g., a year, month, and/or other time period). The access control computing device determines the increase or decrease in the sales revenue for the merchant over that time period based on the aggregation of all of the transaction data associated with the merchant (e.g., by taking the difference of the sales revenue for the time period and the prior time period). Additionally or alternatively, the growth for a merchant may be calculated by fitting total sales revenue (e.g., per time period) to a regression line and tracking resulting slopes.

Additionally or alternatively, quarterly sales revenue (i.e., 3-months' worth of sales revenue data) may be calculated and compared to the corresponding quarter of the previous year. For example, the access control computing device may take the difference between the quarterly sales revenue for a quarter of one year and the quarterly sales revenue for the same quarter of a prior year. As the growth score is a relative ranking, the access control computing device may compare a determined growth of each merchant prior to providing the numerical growth score for each merchant. For example, the access control computing device may sort each raw growth calculation (e.g., the difference in revenue between time periods) for each merchant and/or sector by size of the difference. Based on the ranking of each raw growth, the access control computing device may assign normalized growth scores to each merchant and/or sector. The access control computing device may then use the growth scores of all of the merchants in a sector to determine an aggregated growth score for the sector (e.g., an average or weighted average of the merchant growth scores for the merchants within the sector). Alternatively, the access control computing device may use the determined growth of each merchant in a sector to determine an aggregated growth score for the sector and may subsequently compare sectors. The access control computing device may then provide the (numerical) growth score for the sector.

In one embodiment, the access control computing device may determine a stability score for a merchant using the received transaction data over a time period (e.g., a year, month, and/or other time period). The stability of a merchant is a metric or analytic of the volatility of the merchant's cash flow. The access control computing device may determine an average sales revenue for the merchant over set time intervals within the time period or may receive an average sales revenue for the merchant, per time interval or over the time period. The average sales revenue for the merchant may be an "expected" average sales revenue or other value received from a user associated with the merchant or may be retrieved from a database. The access control computing device may then determine a value range around that average (e.g., one standard deviation, a certain percentage or fraction of the average, or any other suitable range) which indicates stable sales revenue. Using aggregated transaction data, the access control computing device identifies whether the merchant had sales revenue within that range during each time interval in the time period or over the time period as a whole. Falling outside of the range indicates less stable sales revenue and lowers the ranking of the merchant in terms of stability (e.g., an increasing number of time intervals during the time period in which the value falls outside the range results in a decreased stability ranking). For example, the access control computing device may use monthly transaction data to determine, at each month, whether the merchant had sales revenue within the predetermined range. Alternatively, the access control computing device may use transaction data from any other interval (e.g., each week, every two weeks, over the year, etc.) to determine the stability of the sales revenue of the merchant.

In one embodiment, the access control computing device may determine a size score for a merchant using the received transaction data associated with the merchant over a time period (e.g., a year, month, and/or other time period). The size metric or analytic may be considered a proxy analytic for how large a particular merchant or business is. The access control computing device may aggregate the total sales revenue for the merchant for each month or other time interval in the time period, or over the whole time period. As the size score is a relative ranking, the access control computing device may compare a determined size of each merchant prior to providing the numerical size score for each merchant. The access control computing device may then use the size scores of all of the merchants in a sector to determine an aggregated size score for the sector (e.g., an average or weighted average of the merchant size scores for the merchants within the sector). Alternatively, the access control computing device may use the determined size of each merchant in a sector to determine an aggregated size score for the sector and may subsequently compare sectors. The access control computing device may then provide the (numerical) size score for the sector.

In one embodiment, the access control computing device may determine the traffic score for a merchant using the received transaction data over a period of time (e.g., a year, month, and/or other time period). The access control computing device may identify a number of transactions completed at the merchant for the entire time period to determine the traffic for the merchant, or may identify the number of transactions for each of a set time interval in the time period (e.g., each month in the year). Additionally or alternatively, other data may be used to determine the traffic at a merchant, including mobile device signal data, as described in co-owned U.S. patent application Ser. No. 14/708,020, the contents of which are hereby incorporated by reference. As the traffic score is a relative ranking, the access control computing device may compare a determined traffic of each merchant prior to providing the numerical traffic score for each merchant. The access control computing device may then use the traffic scores of all of the merchants in a sector to determine an aggregated traffic score for the sector (e.g., an average or weighted average of the merchant traffic scores for the merchants within the sector). Alternatively, the access control computing device may use the determined traffic of each merchant in a sector to determine an aggregated traffic score for the sector and may subsequently compare sectors. The access control computing device may then provide the (numerical) traffic score for the sector.

In one embodiment, the access control computing device may determine a ticket size score for a merchant using the received transaction data over a time period (e.g., a year, month, and/or other time period) and/or using the determined size and traffic for the merchant. The ticket size (also referred to herein as an "average ticket size") enables improved visibility into the types of merchant in a sector. A low average ticket size, for example, around $5, may indicate a sector includes restaurants or coffee shops. A higher average ticket size, for example, around $2,000, may indicate a sector includes jewelry stores, electronics merchants, or furniture stores. The access control computing device may calculate the ticket size for the merchant by dividing a sales revenue of the merchant by a number of transactions (e.g., for the time period). Alternatively, the access control computing device may calculate the ticket size by dividing a size of the merchant, as determined above, by a traffic of the merchant, as determined above. As the ticket size score is a relative ranking, the access control computing device may compare a determined ticket size of each merchant prior to providing the numerical ticket size score for each merchant. The access control computing device may then use the ticket size scores of all of the merchants in a sector to determine an aggregated ticket size score for the sector (e.g., an average or weighted average of the merchant ticket size scores for the merchants within the sector). Alternatively, the access control computing device may use the determined ticket size of each merchant in a sector to determine an aggregated ticket size score for the sector and may subsequently compare sectors. The access control computing device may then provide the (numerical) ticket size score for the sector.

In one embodiment, the access control computing device may determine a composite score for a merchant based on the growth, stability, size, traffic, and/or ticket size score for the merchant. The composite score may be for a time period. The access control computing device may determine a composite score for a sector, which may be an average of all five scores, may be a weighted average of all five scores, or may be any other combination or aggregation of the five scores for the merchants within the sector (e.g., an average or weighted average of the merchant composite scores for the merchants within the sector) or of the five scores for the sector itself. Alternatively, the composite score for a sector may be an average, weighted average, or any other aggregation of the composite scores of the merchants in the sector. The composite score is intended to be an "at-a-glance" ranking of the relative success of the sector, taken as a function of the five identified characteristics that may reflect the success of a business.

In one embodiment, the access control computing device may update a portfolio record with any or all of the analytics for a merchant and/or any or all aggregated merchant analytics for a sector in which the merchant is located. The access control computing device may be configured to determine analytics for the portfolio as a whole, using the generated analytics for each merchant in the portfolio and/or each corresponding sector. The access control computing device may be further configured to sort the merchants in a portfolio based on the investment goals for the portfolio. For example, if an investment goal identifies growth as a priority, the access control computing device may sort the merchant records in the portfolio record according to highest growth score. If there are no investment goals or if there are conflicting investment goals, the access control computing device may sort the merchant records in the portfolio according to highest composite score.

In alternative embodiments, the data for which the access control computing device controls access is other types of data. Merchant analytics are only an example of the type of data for which the access control computing device controls access. The data which is generated or received by the access control computing device may be any type of data which includes, at least in part, geographic information. Geographic information may include any information used to define an area, region, point, shape, location, or other feature. For example, geographic information may include a latitude and a longitude describing a point or series of points, information describing the relationship between a series of points given by latitude and longitude (e.g., information describing a polygon or other shape), an address, an area defined by the addresses contained within the area, a political division, a geographic feature, surveying information, and/or other information. The access control computing device uses at least the geographic information associated with the data to control access to the data. For example, the access control computing device compares an area for which access is allowed to the geographic information associated with the data to determine for which data to grant access.

The preceding description of the Data Generation Phase may be implemented as a function, computer program, algorithm, and/or other instructions which perform the specific functions described. The function, computer program, algorithm, and/or other instructions may be stored in memory of the access control computing device as a module and executed by a processor of the access control computing device to perform the functions described herein according to algorithm(s) described. Alternatively, the data is generated by another computing device such as a merchant analytics computing device having a function, computer program, algorithm, and/or other instructions stored in memory of the merchant analytics computing device as a module and executed by a processor of the merchant analytics computing device to perform the functions described herein according to algorithm(s) described. The merchant analytics computing device provides the data to the access control computing device.

Enrollment Phase

In an Enrollment Phase, the access control computing device enrolls a user such that the user can access data provided by or through the access control computing device. The access control computing device receives initial login information for the user and also receives geographic information which the access control computing device uses to limit (e.g., control) the amount of data provided to the user. The initial login information and the geographic information are stored in a database of user information which is used by the access control device to control data access on a user by user basis when each user provides login information to the access control computing device.

In some embodiments, the initial login information includes a username and a password. The geographic information includes an initial code segment which defines a bounding area, which in turn defines a geographic area for which the user will be provided associated data falling within the geographic area. The initial code segment defines the geographic area, for example, by describing a bounding area made up of a bounding box or other polygon and may use latitude and longitude coordinates. For example, the code segment may be in the Geography JavaScript Object Notation (GeoJSON) format. The username, login, and the initial code segment can be stored in the database of user information (e.g., as a tuple). In an alternative embodiment, the geographic information specifies the geographic area for which the user will be provided data using alternative geographic information. For example, the geographic information may be an indication of a zip code, an address and a radius extending from the address, and/or other geographic information. The access control computing device may convert the geographic information into a corresponding code segment.

In one embodiment, the access control computing device receives the initial login information and the initial code segment from a remote computing device in communication with the access control computing device. The remote computing device may be a client system, user device, or the like. In some embodiments, the remote computing device includes an enrollment system which generates a template into which an administrative user, on behalf of the user being enrolled, enters the initial login information and the initial code segment. The initial login information (e.g., username and/or password may be temporary and the user may change these once enrolled with the access control computing device). The remote computing device then transmits the template to the access control computing device. In alternative embodiments, the access control computing device hosts a website which includes the template or otherwise receives the template from a server or other computing device which hosts the template. The remote computing device accesses the template via the host, provides information, and the host transmits the template and/or the information received via the template to the access control computing device. In still further embodiments, the user being enrolled with the access control computing device enters the initial login information and initial code segment directly, and no administrative user enters this information on behalf of the user being enrolled.

The template includes at least data fields for an initial username, a password, and a code segment which defines the geographic area for which the user will be given access to the corresponding data by the access control computing device. An administrative user enters a user's desired username into the field for the initial username and the administrative user or the user enters a desired password into the password field. The administrative user enters an initial code segment into the field for the code segment, the initial code segment defining a bounding area (e.g., bounding box) which in turn defines a geographic area. In some embodiments, the code segment is entered manually by the administrative user. In alternative embodiments, the administrative user copies the code segment from a user interface element which allows the administrative user, or the user himself, to define the geographic region graphically (e.g., using a graphic of a bounding area superimposed on a map). For example, the administrative user may instruct the user to define a bounding area using a bounding box displayed on the administrative user's user device or the administrative user may select the area using the bounding box. The user interface element converts the graphic representation of the geographic region (e.g., the graphic of the bounding box) into the initial code segment which corresponds to the graphic representation (e.g., the bounding box relative to the map). In some embodiments, this user interface element is part of the template. In alternative embodiments, the user interface element is a standalone user interface element which is accessed directly (e.g., operating on the remote computing device) or is accessed via an additional website or other resource hosted by the access control computing device and/or another computing device. In further alternative embodiments, the user access the user interface element directly without an intermediate administrative user's input. For example, the user may access the user interface element using their user device.

The user interface element includes a graphical representation of a map. The map may include information such as geographical indicators (e.g., labels on geographic features such as mountain ranges, bodies of water, environmental regions, etc.), political divisions, and/or other information. The user interface element further includes a bounding area (e.g., bounding box or other shape) graphically displayed overlaid on top of the map. The bounding area (e.g., represented by a bounding box) can be resized and repositioned on the map. The map can be zoomed in (e.g., enlarged) and zoomed out (e.g., reduced). The administrative user or the user himself can reposition and resize the bounding area and/or zoom the map such that the bounding box encompasses the geographic area and/or political divisions about which the user desires to have access to the related data associated with that area or areas. In further embodiments, the user interface element includes a search field which allows the administrative user or the user himself to search for an address, business name, political division, or the like. Search results are displayed on the map allowing the administrative user, or user himself, to position the bounding box to encompass merchants, areas, or features of interest for which the user desires to have access to corresponding data.

The user interface element further includes a field which displays a code segment corresponding to the bounding area which the administrative user or the user has sized and/or positioned. For example, the bounding area may be a bounding box and the code segment may include delineated sets of latitude and longitude values which correspond to the corners of the bounding box as positioned on the map. The code segment is formatted according to the formatting requirements of a particular function, program, or the like. The code segment may further include additional information which defines the relationship between the points forming the corners of the bounding box (e.g., an order in which the points of the corners connect to form the bounding box) and/or other information needed by the function, program, or the like to define an area corresponding to the bounding box. In alternative embodiments, the bounding area can be other shapes. For example, the bounding box may be polygonal, circular, elliptical, and/or have other geometries or combinations of geometries. The user interface element populates the field displaying the code segment based on the input received via the graphical bounding area and the graphical map. For example, the user interface element may determine the location of the corners and/or other features of the bounding area relative to the map and query a database of latitudes and longitudes corresponding to display positions of the bounding area and/or map. The result returned from the query is displayed in the field displaying the code segment (e.g., after having been formatted for a particular programming language). In an alternative embodiment, the user interface element does not display the code segment (e.g., the field is hidden). The user interface element provides the code segment to the template without displaying the code segment to the user. Or, the code segment is made visible only to the administrative user.

In alternative embodiments, the administrative user, or the user himself, may select a geographic region or political division (e.g., state, county, city, etc.) and the user interface element creates a bounding area and corresponding code segment which encompasses the selected geographic region or political division. For example, a user may specify that they desire access to data related to items located in the state of California. The administrative user or the user himself enters this information in the user interface element (e.g., by clicking on a graphical representation of the state of California). The user interface element queries information stored in memory (e.g., a database) which defines the geographic boundaries of the selected region or political division. Using this information, the user interface element generates a code segment which corresponds to a bounding area encompassing the selected region or political division. For example, the user interface element may generate a code segment which corresponds to a bounding box minimally encompassing the selected region or political division by comparing the code segment to the points or other geographic information retrieved from the database. The user interface element may iteratively generate code segments and compare them to the definition of the region or political division, for example, using a GeoJSON format and function such as "$geoWithin." When the region or political division is within the bounding box corresponding to the code segment and reducing the size of the bounding box causes this condition to no longer be satisfied, the user interface element displays, stores, or transmits the code segment corresponding to the bounding box containing the selected region or political division.

In some embodiments, the code segment is formatted according to the requirements of the function, program, or the like used by the access control computing device For example, the syntax, formatting, or the like may vary depending on the selected code segment type. In one embodiment, the code segment is formatted according to the requirements of GeoJSON. In alternative embodiments, the code segment is formatted according to the requirements of other programming languages or otherwise formatted. For example, the code segment may be formatted according to or as Keyhole Markup Language (KML), as Open Geospatial Consortium Well-Known Text (OGC WKT), a Machine Readable Cataloging (MARC) standard, as comma separated values, and/or as other formats. In still further embodiments, the user interface element includes a dropdown menu from which the user may select the programming language for which the code segment is formatted.

Once the administrative user, or user himself, has provided input which fills the fields for initial username, password, and initial code segment, the template is transmitted to the access control computing device which receives the template and/or the information therein. Alternatively, if the access control computing device hosts the template or receives the enrollment information directly, then the template is not transmitted to the access control computing device. Using the information received, the access control computing device populates a database of login information with the username, password, and initial code segment. This information is stored as associated information (e.g., as a tuple).

In some further embodiments, the access control computing device may check for conflicts prior to storing the received enrollment information in the database of login information. For example, the access control computing device may compare the username received in the enrollment information to the usernames of the database of login information to ensure that the username has not already been stored. In some embodiments, the access control computing device determines whether the initial code segment received in the enrollment information conflicts with (e.g., overlaps) with a code segment already stored in the database of login information. For example, the access control computing device may provide access to each sector exclusively to one user. The access control computing device prevents enrollment of a user having an initial code segment which defines an area including a sector that falls within an area defined by a code segment already stored in the database of login information. The access control computing device compares the initial code segment to the code segments stored in the database of login information using one or more functions. For example, the code segments may be in the GeoJSON format and the access computing device uses a function such as "$geoIntersects" with function inputs of the initial code segment and one or more code segments stored in the database of login information. In alternative embodiments, the access control computing device may provide concurrent access to data for the same sector to multiple users. If there is a conflict (e.g., between usernames and/or code segments), the access control device may notify the administrative user or the user (e.g., prompt the administrative user to have the user select a different username and/or geographic region).

In some embodiments, the access control computing device receives additional information pertaining to a user in the Enrollment Phase. This additional information may be used by the access control computing device to control the display of or otherwise manage data for purposes other than access control (e.g., tracking a specific merchant's performance, defining a plurality of merchants of particular interest for which data will be displayed, etc.). In the example embodiment, the access control computing device is configured to receive information describing a merchant in a merchant management portfolio during a configuration period such as the Enrollment Phase. In an example embodiment, a user (e.g., a commercial real estate owner or lender, a business owner, or marketing director) may access the access control computing device (directly or via any suitable client user computing device in communication with the access control computing device) and may provide such information. The information is received by the access control computing device. Information describing or associated with particular merchants may be referred to as "merchant definitions," and may be used to identify and/or evaluate (e.g., score) each merchant. Merchant definitions include information associated with merchant locations including property identifiers, property location information, address(es), and/or other merchant location information. Merchant definitions may further include merchant classification information. In some implementations, merchant definitions may further include information relating to the real estate asset or property of which the merchant is a tenant (or owner), as described in co-owned U.S. patent application Ser. No. 14/564,440, the contents of which are herein incorporated by reference. For example, merchant definitions may further include pricing of a real estate asset, vacancy factors of the asset, square footage of the asset, tax information associated with the asset, and other data that may be used to adjust the analytics (e.g., valuation) of a tenant merchant and/or of a real estate asset. The user may also provide various other data associated with the user ("user data"). For example, in implementations in which the user is associated with a business (e.g., a merchant), the user may import or provide various metrics associated with the business, including budgets, marketing data, and/or goals (e.g., increase growth, increase ticket size, increase traffic).

As used herein, "merchant management portfolio" (alternately referred to as a "portfolio") refers to a collection of merchants in different locations but managed by one entity or user, generally. In the example embodiment, a merchant management portfolio may be described by merchant definitions and/or user data and may be represented as an electronic record that may be referred to as a "merchant management portfolio record" or a "portfolio record." Accordingly, the access control computing device processes merchant definitions and any imported user data associated with a plurality of merchants to create a portfolio record.

"Property identifiers" may include known names (or any suitable unique alphanumeric identifier) of commercial real estate assets of which a merchant is a tenant, owner, etc. (e.g., "XYZ Mall"). In an example embodiment, the access control computing device uses property identifiers to designate a location for each merchant within the portfolio record. As described below, a user may accordingly view and manage individual merchants within a portfolio distinguished by identifiers including property identifiers.

"Property location information" may include any information defining the geographic location of a merchant and/or other merchant location information. In some examples, property location information may include physical addresses, geographic coordinates in latitude and longitude, elevation information (e.g., a floor or floors of a building associated with a commercial real estate asset), and any other suitable information. In some examples, property location information may include boundary information defining a physical area (or areas) containing the merchant. In an example embodiment, property location information may be used by the access control computing device to identify the merchant graphically (i.e., to provide visually mapped information showing the physical location of the merchant).

"Merchant classification information" includes information categorizing the merchant within categories that may be relevant to the monitoring of the value of the merchant. For example, merchant classification information may categorize a merchant according to a particular industry, location, or other classification, for example, "retail", "office", "warehouse", "manufacturing", "healthcare," "outdoor mall", "indoor mall" and any other suitable information.

The access control computing device may also generate a unique portfolio identifier in the Enrollment Phase to identify the portfolio record. Accordingly, a user device (operated by a user) may provide such a portfolio identifier at a later point in time and retrieve the portfolio record to review or monitor portfolio defined by the portfolio record. The portfolio record may be stored in a database (e.g., as a listing of or series of tuples for each merchant definition identified by the user as included in the portfolio). The portfolio may be used to track, store, present, output, and/or otherwise manipulate merchant analytics for a plurality of merchants within a single portfolio. Merchants may be assigned a portfolio identifier (e.g., number, string, and/or other piece of information) by the access control computing device in response to receiving the merchant definitions and/or identification of merchant definitions as included in the portfolio from a user. For example, the access control computing device may include a portfolio identification number as one entry of a tuple for each merchant definition included in the portfolio as identified by the user. This allows the access control computing device to retrieve information stored with and/or as a part of the merchant definition (e.g., in the tuple for each merchant) based on the portfolio identification number such that information related to all the merchants within the portfolio may be retrieved.

In at least some examples, the user data received by the access control computing device includes a plurality of investment goals associated with each merchant and/or with the portfolio. At least parties associated with the portfolio (e.g., commercial owners or lenders, marketing directors, investors, managers) may have varying financial goals for a portfolio. Because investors and lenders may vary in their underlying interests, the access control computing device may be configured to monitor merchants pursuant to such investment goals. For example, the access control computing device may be configured to identify certain merchants meeting or exceeding the investment goals and other merchants not meeting the investment goals, such that the investors may make financial decisions regarding the relative worth or success of the various merchants. In one embodiment, the access control computing device receives investment goal information for a particular merchant from a user (e.g., from a client device used by the user). The access control computing device may store the goal information in a database entry corresponding to the related merchant. For example, the goal information may be stored as an entry in a tuple which includes merchant identifier(s), merchant analytics determined as described herein, and/or other information. The access control computing device may determine if a particular merchant has met or exceeded an investment goal by comparing the goal information stored in the tuple with the merchant analytics and/or transaction data stored in the tuple. For example, the access control computing device may take goal information of a merchant and subtract from this goal the corresponding merchant analytics stored in the tuple. If the difference is positive, then the goal has not been met or exceeded. If the difference is zero or negative then the goal has been met or exceeded, respectively. Other analytical tools or methods may be used to determine if goals are met in other embodiments. The determination of whether a goal has been met or exceeded can be output and/or displayed to a user or other location (e.g., the determination may be output as instructions to control the display of information on a user interface of a user-controlled client device in communication with the access control computing device). The user data may also include various specifications descriptive of existing merchants and/or merchant locations in the portfolio or descriptive of merchants and/or merchant locations outside of the portfolio (in the case of a commercial real estate broker looking to buy, rent, or lease a merchant location).

In one particular example, a business may own, or otherwise be associated with, multiple merchants at multiple merchant locations. A user interested in the marketing money invested in the various merchants (e.g., a marketing director or Chief Marketing Officer) may import investment goals to the access control computing device that accord with the goals of the business. For example, the user may have a marketing budget of $500 million. The investment goals may prioritize the merchants with the highest growth, such that a higher percentage of the marketing budget may be spent near those merchants. The investment goals may alternatively prioritize merchants with the highest traffic, highest ticket size, or highest stability. Accordingly, as will be described further herein, the access control computing device may use the investment goals to identify the merchant(s) with the strongest merchant analytics (e.g., highest scores) to the user.

The preceding description of the Enrollment Phase may be implemented as a function, computer program, algorithm, and/or other instructions which perform the specific functions described. The function, computer program, algorithm, and/or other instructions may be stored in memory of the access control computing device as a module and executed by a processor of the access control computing device to perform the functions described herein according to algorithm(s) described. Alternatively, the data is generated by another computing device such as a merchant analytics computing device or remote computing device having a function, computer program, algorithm, and/or other instructions stored in memory as a module and executed by a processor to perform the functions described herein according to algorithm(s) described. The merchant analytics computing device or remote computing device provides the enrollment information to the access control computing device.

Login Phase

In a Login Phase, the access control computing device receives a candidate login input corresponding to a user. For example, the access control computing device may host or be in communication with a computing device which hosts a website serving as the information services portal. A user computing device (e.g., user device) transmits candidate login information (e.g., in the form of a candidate login input) directly or indirectly to the access control device (e.g., through the website and the host). The candidate login information includes a username and a password.

In response to receiving the candidate login input, the access control computing device compares the candidate login information to the database of login information (e.g., a list of stored login entries generated for multiple users in the Enrollment Phase). The access control computing device queries the database (e.g., list) of login entries with the username included in the candidate login information and determines if there is a match with a username in the database of login information. If there is no match, the access control computing device may cause a prompt or message to be displayed on the user device which indicates that the username may be incorrect and/or a prompt for the user to enroll.

If there is a match between a username of the candidate login information and a username stored in the database of login information, the access control computing device compares the password included in the candidate login information to the password stored in the database of login information and corresponding to (e.g., stored as a tuple entry with) the matched username. If the password of the candidate login information does not match the password stored in the database of login information, the access control computing device may cause the user device to display a prompt indicating that the password was incorrect. If the password of the candidate login information matches the password stored in the database of login information for the username, the access control computing device causes the user device to display data, for example, using one or more of the techniques described herein with reference to the Data Display Phase. For example, the access control computing device may host a website and/or otherwise provide instructions to the user device which causes the display of data (e.g., merchant analytics data corresponding to one or more sectors). In some embodiments, the access control computing device causes the user device to display a loading screen, home screen, or other intermediate display prior to displaying the data. For example, when the intermediate screen is displayed, the access control computing device may be retrieving, formatting, etc. the data for which the user has access.

Upon determining that the candidate login information (e.g., username and password) matches information stored in the database of login information, the access control computing device retrieves information used to restrict the user's access to data. In some embodiments, the access control computing device retrieves from the database of login information a selected code segment corresponding to the username (e.g., stored in the database of login information as a tuple entry along with the username and password). As previously described, the code segments corresponding to the usernames are entered into the database of login information during the Enrollment Phase. The code segments define a geographic area corresponding to a bounding area that the user has used to indicate that they desire access to data corresponding to the geographic area (e.g., the sectors included in the geographic area defined by the code segment). The access control computing device retrieves from the database of login information the selected code segment which corresponds to the username which was received as candidate login information. The access control computing device uses the selected code segment to control access to data which can be displayed on the user device (e.g., data received and/or generated during the Data Generation Phase).

Data Display Phase

In a Data Display Phase, the access control computing device uses the information retrieved from the database of login information to restrict the user's access to data and provides to the user the information to which the user has access. In some embodiments, the access control computing device applies a geographic restriction (e.g., based on the selected code segment) to a data set stored in memory which includes values to be displayed for a plurality of geographic sectors (e.g., merchant analytics). In other words, the access control computing device applies the geographic restriction which is based on the bounding area, used to define a user's area of interest in the Enrollment Phase, to the data values available for display by using the selected code segment which defines the bounding area. In applying the geographic restriction, the access control computing device may, for example, compare the selected code segment to location data associated with each of the plurality of sectors for which corresponding values are stored in the dataset. This may include using a function which determines which sectors are located within the area defined by the code segment. For example, the location of each sector may defined as a point (e.g., centered in the sector) further defined by the point's latitude and longitude. This may correspond to a census block used to define the sectors in the Data Generation Phase. This may also correspond to an average of several census block points included within a larger sector. The code segment may define the geographic area corresponding to the bounding area using the GeoJSON format. The access control computing device may use a function such as "$geoWithin" and inputs including the selected code segment and the coordinates defining each sector to determine which sectors are located within the area to which the user has access to the corresponding data. The function outputs those sectors which are within the area defined by the selected code segment. These are the areas for which the user has access as defined by the bounding area used to enroll the user. The access control computing device uses the output to identify the values and sectors of the data set which are to be displayed to the user.

In an alternative embodiment, the sectors may be defined using polygons and/or other shapes. In that case, the access control computing device uses a function to determine if the sectors intersect with the area defined by the selected code segment. For example, the code segment and the sectors may be defined in a GeoJSON format. The access control computing device may use a function such as "$geoIntersects" with inputs including the selected code segment and the definitions of the sectors. The function outputs those sectors which interest the area defined by the selected code segment. These are the areas for which the user has access as defined by the bounding area used to enroll the user. The access control computing device uses the output to identify the values and sectors of the data set which are to be displayed to the user.

In further alternative embodiments, the access control computing device uses one or more of these techniques in combination and/or uses one or more alternative techniques, functions or algorithms to determine which sectors are located within or partially within the area defined by the bounding area during enrollment of the user (e.g., apply a geographic restriction to the data set corresponding to the sectors).

In some embodiments, the access control computing device uses one or more of the previously described techniques to identify the sectors falling within the area of interest defined by the bounding area prior to the Data Display Phase. For example, the access control computing device may as part of the Enrollment Phase use the code segment submitted with the initial login information and the template to identify sectors encompassed by the area. The access control computing device may store the identified sectors in the database of login information as an entry or entries corresponding to the username submitted with the initial login information (e.g., stored as a tuple). In the Data Display Phase, the access control computing device uses the username received in the Login Phase to retrieve the list of sectors stored in the database of login information and displays data associated with those sectors in the Data Generation Phase. The output of the retrieved list of sectors is used by the access control computing device to identify the values and sectors of the data set which are to be displayed to the user.

In some embodiments, a user's access to data is not limited to area defined by the bounding area used to enroll the user in the Enrollment Phase. The access control computing device may allow a user to redefine the area for which the user is provided access to data. For example, a user may redraw a new or supplemental bounding area using the user interface which displays the data. The access control computing device updates the database of login information with a new code segment reflecting the area and sectors encompassed in the new or supplemental bounding area. The access control computing device uses the new code segment to identify the sectors for which corresponding data values are to be displayed using the techniques described herein.

Once the access control computing device has the output which identifies the sectors to be displayed (e.g., the sectors for which the user has access), the access control computing device uses the identification of the sectors to retrieve values for display corresponding to each sector. For example, the access control computing device may query a data set in a database which includes data values, sector definitions (e.g., point coordinates), sector identifiers, and/or other information for each sector generated during the Data Generation Phase. The access control computing device causes the values for each sector for which the user has access to be displayed to the user. For example, the access control computing device may host a website which provides the information services portal and the access control computing device transmits instructions which cause the website to display a user interface graphically representing the sectors and the values associated with each sector for which the user has access. Sectors for which the user does not have access to the corresponding data may be displayed by the corresponding data is not displayed. In alternative embodiments, the access control computing device transmits instructions to another computing device (e.g., a merchant analytics computing device) which cause that computing device to display values for a subset of the sectors identified by the access control computing device as sectors for which the user has access to corresponding data. In still further embodiments, the access control computing device may transmit instructions to a user device running an application or program which serves as the information services portal, the instructions formatted to cause the user device to display the data associated with the sectors identified by the access control computing device as those sectors to which the user has access to corresponding data.

User Interface

The access control computing device is further configured to facilitate the display of an interactive graphical user interface (UI). The UI may be displayed on a user computing device of a user. The UI is configured such that the user may easily view aggregated merchant analytics for a sector and/or for a particular industry, for example, as a graphical representation displayed on a map. The UI is populated with data for which the access control computing device has determined that the user has access as described in the Data Display Phase. The UI is populated with data that is updated following the end of a time period for which merchant scores and/or merchant analytics are determined. For example, the UI may be populated with data that is updated on a monthly basis, however, in other embodiments, the UI may be populated with data updated at any other interval (e.g., weekly, daily, etc.). In some embodiments, a user of the UI may determine at what interval the UI is populated with updated data. For example, the access control computing device may use time periods of one week for determining merchant and/or sector scores and/or analytics. A user of the UI may provide an input which the access control computing device receives via a network and from the user computing device providing the UI which causes the access control computing device to update the information provided to the user computing device for generating the UI at different intervals, for example one month. The access control computing device may determine merchant and/or sector scores and/or analytics weekly with the UI of the client system displaying updated information based on and/or including the merchant and/or sector scores and/or analytics every month.

In the example embodiment, the user may search by location to find a geographic region (e.g., state, city, zip code, zip+4, county, neighborhood, and/or other geographic region) in which the user is interested. The UI displays the geographic location divided into defined sectors. In some embodiments, the UI enables a user to "zoom in" and "zoom out" on the view. Zooming in may provide a view of the sectors at a more granular level. Zooming out may provide a view of sectors aggregated into larger geographic regions, for example, by city, county, or state. In the example embodiment, displayed sectors are colored or shaded according to the strength of generated merchant analytics, wherein a darker or more saturated color or shade indicates stronger analytics (e.g., more successful sectors). Accordingly, the user may easily discern sectors with stronger analytics, with only a single glance. In other embodiments, lighter colors may indicate stronger analytics. In still other embodiments, the sectors may not be colored or shaded at all.

The UI may provide to the user an option to view sectors according to different metrics (e.g., according to the various scores described above included within the merchant analytics). The UI may also allow the user to switch between a "street map" view, in which the divisions of defined sectors are overlaid upon a traditional street map, and a "satellite view", in which the defined sectors are overlaid upon satellite imagery of the geographic region. Accordingly, depending on the view, users may be able to more easily understand the delineations between sectors and the geographical advantages that may serve certain sectors over others. In addition, as will be described further herein, the UI may provide other tools to the user for navigation of the merchant analytics and for a "deeper dive" into the granularity of the analytics.

The UI is generated based on the data from the dataset which the access control computing device determines that the user has access to. The user can manipulate the data displayed in the UI but is restricted to the data for which the user has access as determined by the access control computing device in the Data Display Phase.

The systems and methods described herein are configured to facilitate (a) improved data security by limiting access to data based on geographic information associated with the data and based on an area defining the access available to a user, (b) improvement of the definition of an area for which a user desires to access associated data by using a bounding area and associated code segment, and (c) optimization of the display of information across geographic areas by displaying information associated with areas of interest designated by a user.

The technical effects of the systems and methods described herein can be achieved by performing at least one of the following steps: (i) receiving a candidate login input corresponding to a user; (ii) comparing the candidate login input to a list of login entries stored in a memory, each of the stored login entries having a corresponding code segment, each code segment defining a bounding area defining a geographic area; (iii) retrieving from the memory a selected code segment corresponding to the stored login entry matching the candidate login input; (iv) applying a geographic restriction to the data set by processing the selected code segment; and (v) transmitting a data subset of the data set to the user computing device for display, the data subset including data satisfying the geographic restriction. As described herein the technical effects of the systems and methods described herein include, at least, controlling access to data based on geographic information associated with the data. This increases security of the data by displaying data only to those parties for which access is granted.

The following detailed description of the embodiments of the disclosure refers to the accompanying drawings. The same reference numbers in different drawings may identify the same or similar elements. Also, the following detailed description does not limit the claims.

Described herein are computer systems such as access control computing devices and user computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the generation and communication (e.g., display) of sole and/or aggregate merchant and/or sector valuation analytics, scores, and/or other analytics.

FIG. 1 is a schematic diagram illustrating an example multi-party payment card system 20 for enabling payment-by-card transactions and communicating aggregated merchant analytics for a sector, in accordance with one embodiment of the present disclosure. Payment card system 20 also enables geographic access control to the aggregated merchant analytics and/or other data generated based on the transaction data handled by payment card system 20. FIG. 1 depicts a flow of data in a typical financial transaction through system 20, which includes an access control computing device 112. Components of system 20 provide access control computing device 112 with transaction data, which access control computing device 112 processes to generate merchant analytics or other data, control access to the data, and provide the data on a user interface. In alternative embodiments, access control computing device 112 may be in communication with a merchant analytics computing device which generates data such as merchant analytics. In such an embodiment, the merchant analytics computing device is in communication with payment card system 20, and access control computing device 112 is in communication with the merchant analytics computing device.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. Cardholder 22 may purchase goods and services ("products") at merchant 24. Cardholder 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. Merchant 24 receives cardholder's 22 account information as provided by cardholder 22. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information and/or transaction information such as a type of merchant, amount of purchase, date of purchase, and/or other information in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, transaction data including such additional transaction data may also be provided to systems including access control computing device 112. In the example embodiment, interchange network 28 provides such transaction data (including merchant data associated with merchant tenants of each commercial real estate asset of each portfolio record) and additional transaction data. In alternative embodiments, any party may provide such data to access control computing device 112.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described below in more detail, access control computing device 112 may be used to generate and communicate aggregated merchant analytics or other data. Although the systems described herein are not intended to be limited to facilitate such applications, the systems are described as such for exemplary purposes. For example, access control computing device 112 may receive aggregated merchant analytics and/or other data from a merchant analytics computing device which is in communication with payment card system 20. A merchant analytics computing device may perform the data generation (e.g., merchant analytics) functions of access control computing device 112 described herein and transmit that information to access control computing device 112.

Figure 2:
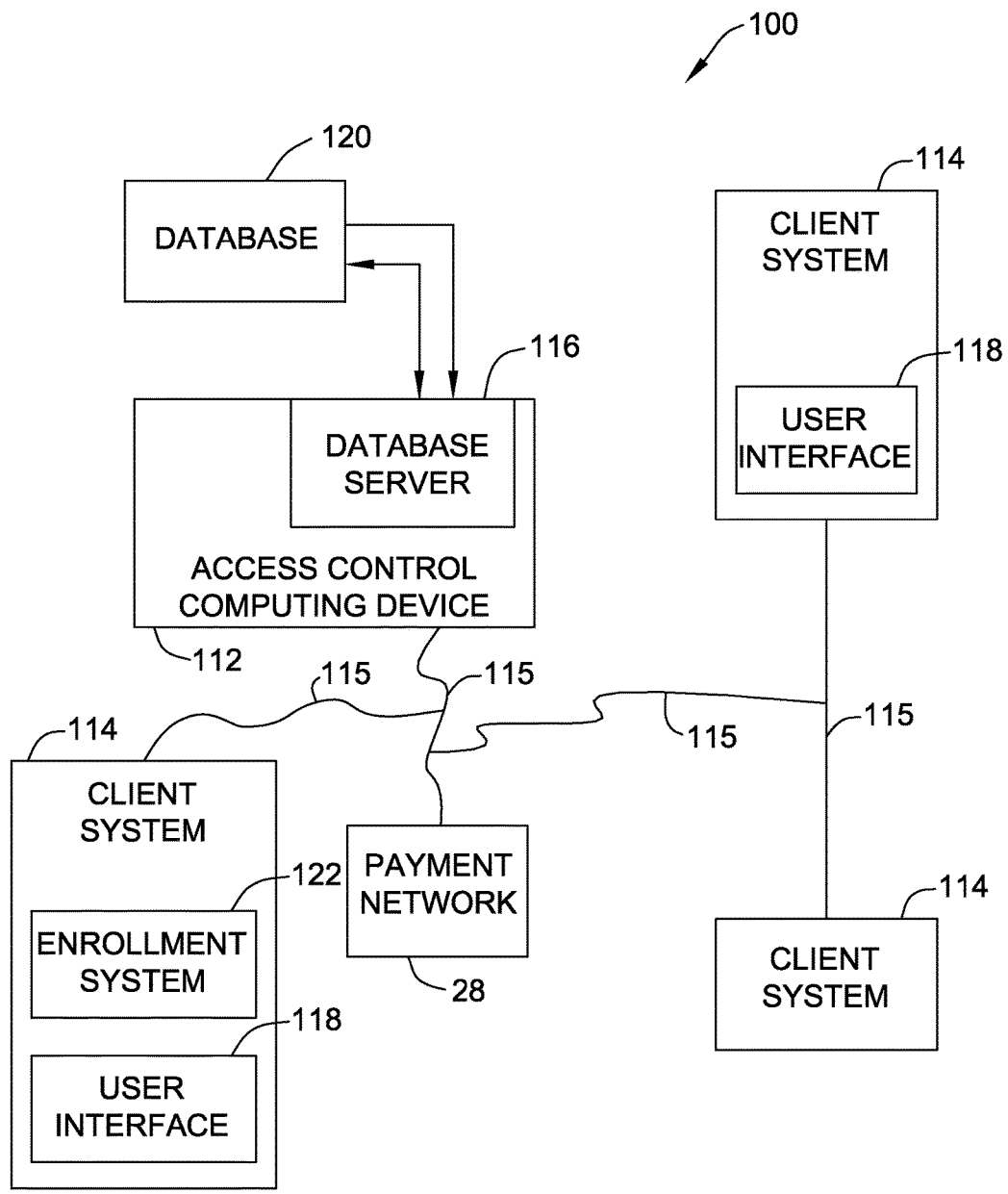

FIG. 2 is an expanded block diagram of an example embodiment of a computer system 100 used in processing payment transactions that includes access control computing device 112 in accordance with one example embodiment of the present disclosure. In the example embodiment, system 100 is used for generating merchant analytics or other data, controlling access to the data, and displaying said analytics or other data on a user interface, as described herein.

More specifically, in the example embodiment, system 100 includes an access control computing device 112, and a plurality of client sub-systems, also referred to as client systems 114, connected to access control computing device 112. In one embodiment, client systems 114 are computers including a web browser, such that access control computing device 112 is accessible to client systems 114 using the Internet and/or using network 115. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 may include systems associated with cardholders 22 (shown in FIG. 1) as well as external systems used to store data. Access control computing device 112 is also in communication with payment network 28 using network 115. Further, client systems 114 may additionally communicate with payment network 28 using network 115. Client systems 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on access control computing device 112 and can be accessed by potential users at one of client systems 114 by logging onto access control computing device 112 through one of client systems 114. Access to centralized database 120 is controlled by access control computing device 112 as described herein to limit the display of data to geographic regions for which a user has access as defined in an Enrollment Phase in which the user is enrolled with access control computing device 112. In an alternative embodiment, database 120 is stored remotely from access control computing device 112 and may be non-centralized. Database 120 may be a database configured to store information used by access control computing device 112 including, for example, transaction data, defined sectors, merchant definitions, user data, portfolio records, merchant scores, sector scores, a data set including this and/or other data, a database of login information including code segments defining a geographic area of interest for each user, and/or other data.

Database 120 may include a single database having separated sections or partitions, or may include multiple databases, each being separate from each other. Database 120 may store transaction data generated over the processing network including data relating to merchants, consumers, account holders, prospective customers, issuers, acquirers, and/or purchases made. Database 120 may also store account data including at least one of a cardholder name, a cardholder address, an account number, other account identifiers, and transaction information. Database 120 may also store merchant information including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, one of client systems 114 may be associated with one of acquirer bank 26 (shown in FIG. 1) and issuer bank 30 (also shown in FIG. 1). For example, one of client systems 114 may be a POS device. Client systems 114 may additionally or alternatively be associated with a user (e.g., a commercial real estate owner or lender, a marketing director, a consumer, or any other end user). In the example embodiment, one of client systems 114 includes a user interface 118. For example, user interface 118 may include a graphical user interface with interactive functionality, such that aggregated merchant analytics, transmitted from access control computing device 112 to client system 114, may be shown in a graphical format. A user of client system 114 may interact with user interface 118 to view, explore, and otherwise interact with the merchant analytics. Access control computing device 112 may be associated with interchange network 28 and/or may process transaction data. Client systems 114 may additionally or alternatively be associated with a user who enrolls himself or other users with access control computing device 112. In those cases where the user enrolls others with access control computing device 112, that user may be referred to as an administrative user. Such a remote computing device or client system 114 includes user interface 118 for entering information in the template used in enrolling a user. User interface 118 is also used to select a geographic area using the bounding area (e.g., bounding box) and retrieve a code segment from the user interface element described in the Enrollment Phase. In some embodiments, client system 114 may include enrollment system 122. Enrollment system 122 may be, for example, a program or application which runs on client system 114 for enabling administrative users to enroll users with access control computing device 112. Enrollment system 122 may display the template for receiving initial login information. Enrollment system 122 may also generate the user interface element described in the Enrollment Phase which allows for selection of a geographic area for which the enrolled user will be provided access to corresponding data. Enrollment system 122 generates the initial code segment. The enrollment information (e.g., initial username, initial password, initial code segment, payment information, etc.) is transmitted by enrollment system 122 via client system 144 and network 115 to access control computing device 112.

In alternative embodiments, enrollment system 122 is accessed remotely by client system 114. Enrollment system 122 may be hosted by or stored on access control computing device 112 and accessed by client system 114. For example, enrollment system 122 may be stored on and executed by access control computing device 112. Client system 114 may provide inputs to access control computing device 112 via network 115 which are used by access control computing device 112 to execute enrollment system 122. These inputs may be received by a website hosted by access control computing device 112. The website may further provide output to client system 114.

In one embodiment, an administrative user uses client system 114 and enrollment system 122 to enroll a user with access control computing device 112. The administrative user selects the geographic region for which the user will have access to corresponding data. For example, the administrative user may select a region or area using a bounding area (e.g., bounding box) displayed by a user interface element and enrollment system 122 operating on a client device 114 of the administrative user. In response the user interface element and enrollment system 122 generate a corresponding code segment which may be entered into a template automatically, entered into a template by the administrative user, or otherwise provided to access control computing device 112. Alternatively, the administrative user may select a region or political division for which the user interface element and enrollment system 122 automatically generate a codes segment corresponding to a bounding area which encompasses the region or political division.

In alternative embodiments, the administrative user receives information defining a bounding area, code segment, or region or political division selection from a user. The administrative user may also receive login information from the user. The administrative user receives this information from a first client system 114 used by the user and receives the information by a second client system 114 used by the administrative user. The client system 114 used by the user may have access to a website (e.g., hosted by access control computing device 112), application (e.g., enrollment system 112), or other tool which the user uses to define a bounding area, generate a code segment, select a region or political division, or otherwise generate the information provided to the administrative user. The administrative user may use the bounding area selected by the user and the user interface element and/or enrollment system 122 to define the code segment and provide the code segment and/or login information to access control computing device 112 (e.g., via a template). The administrative user may use a code segment received from the user to fill a template and provide the information to access control computing device 112. The administrative user may further use enrollment system 122 to generate a code segment based on the user's selection of a region or political division received by the administrative user.

In further alternative embodiments, the user enrolls himself with access control computing device 112 using client system 114. For example, the user may access a webpage hosted by access control computing device 112 and providing a user interface element and/or template, access an application (e.g., enrollment system 122) running on client system 114 providing the user interface element and/or template, and/or otherwise use the tools described herein to generate enrollment information (e.g., username, password, and code segment defining an area) and transmit the enrollment information to access control computing device. The user may directly use a user interface element displayed on client system 114 to create a bounding area (e.g., bounding box) and enter the corresponding code segment in a template. The client system 114 transmits the code segment and other enrollment information to access control computing device 112. The user may alternatively specify a region or political division which access control computing device 112 uses, upon receipt, to generate a corresponding code segment.

Figure 3:
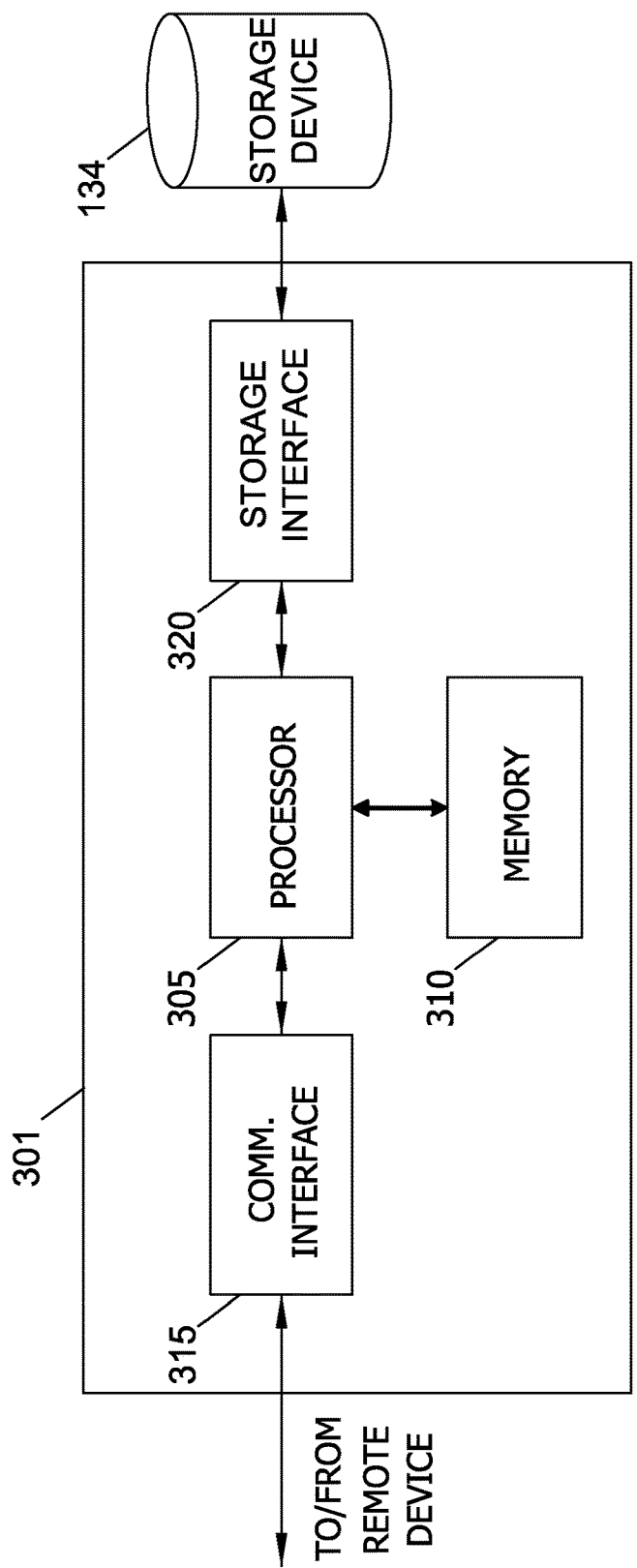

FIG. 3 illustrates an example configuration of a server system 301 such as access control computing device 112 (shown in FIGS. 2 and 3) used to generate merchant analytics or other data, to control access to the data, and to present said data on an interactive user interface, in accordance with one example embodiment of the present disclosure. Server system 301 may also include, but is not limited to, database server 116. In the example embodiment, server system 301 determines and analyzes characteristics of devices used in payment transactions, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests (e.g., requests to display merchant analytics and/or provide an interactive user interface) from a client system 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
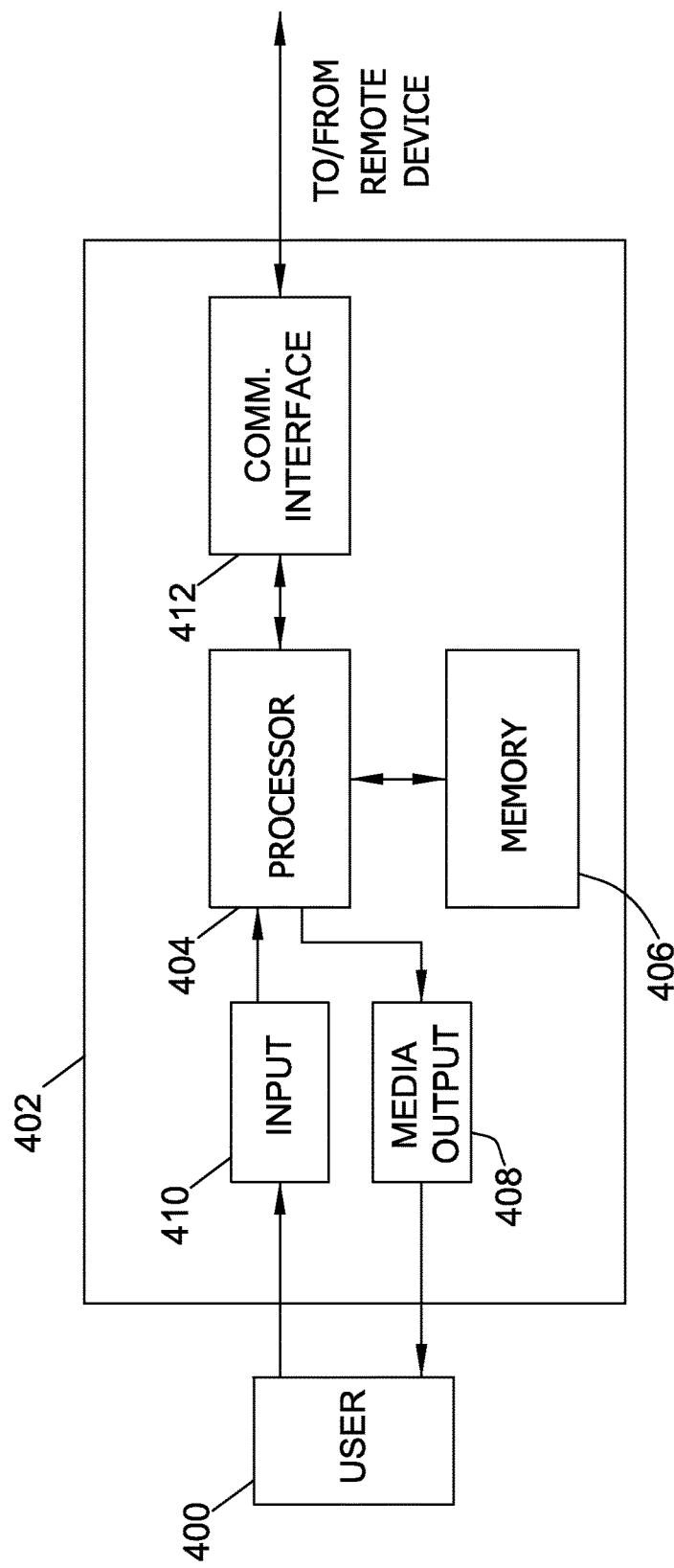

FIG. 4 illustrates an example configuration of a client computing device 402. Client computing device 402 may include, but is not limited to, client systems ("client computing devices") 114. Client computing device 402 includes a processor 404 for executing instructions. In some embodiments, executable instructions are stored in a memory area 406. Processor 404 may include one or more processing units (e.g., in a multi-core configuration). Memory area 406 is any device allowing information such as executable instructions and/or other data to be stored and retrieved. Memory area 406 may include one or more computer-readable media.

Client computing device 402 also includes at least one media output component 408 for presenting information to a user 400 (e.g., a cardholder 22). Media output component 408 is any component capable of conveying information to user 400. In some embodiments, media output component 408 includes an output adapter such as a video adapter and/or an audio adapter. An output adapter is operatively coupled to processor 404 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 410 for receiving input from user 400. Input device 410 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 408 and input device 410.

Client computing device 402 may also include a communication interface 412, which is communicatively couplable to a remote device such as server system 302 or a web server operated by a merchant. Communication interface 412 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 406 are, for example, computer-readable instructions for providing a user interface to user 400 via media output component 408 and, optionally, receiving and processing input from input device 410. A user interface may include, among other possibilities, a web browser and client application. Web browsers enable users 400 to display and interact with media and other information typically embedded on a web page or a website from a web server associated with a merchant. A client application allows users 400 to interact with a server application associated with, for example, a merchant. The user interface, via one or both of a web browser and a client application, facilitates display of generated merchant analytics by access control computing device 112. The user may interact with the user interface to view and explore the merchant analytics, for example, by selecting a sector of interest using input device 410 and viewing analytics associated with that sector.

Figure 5:
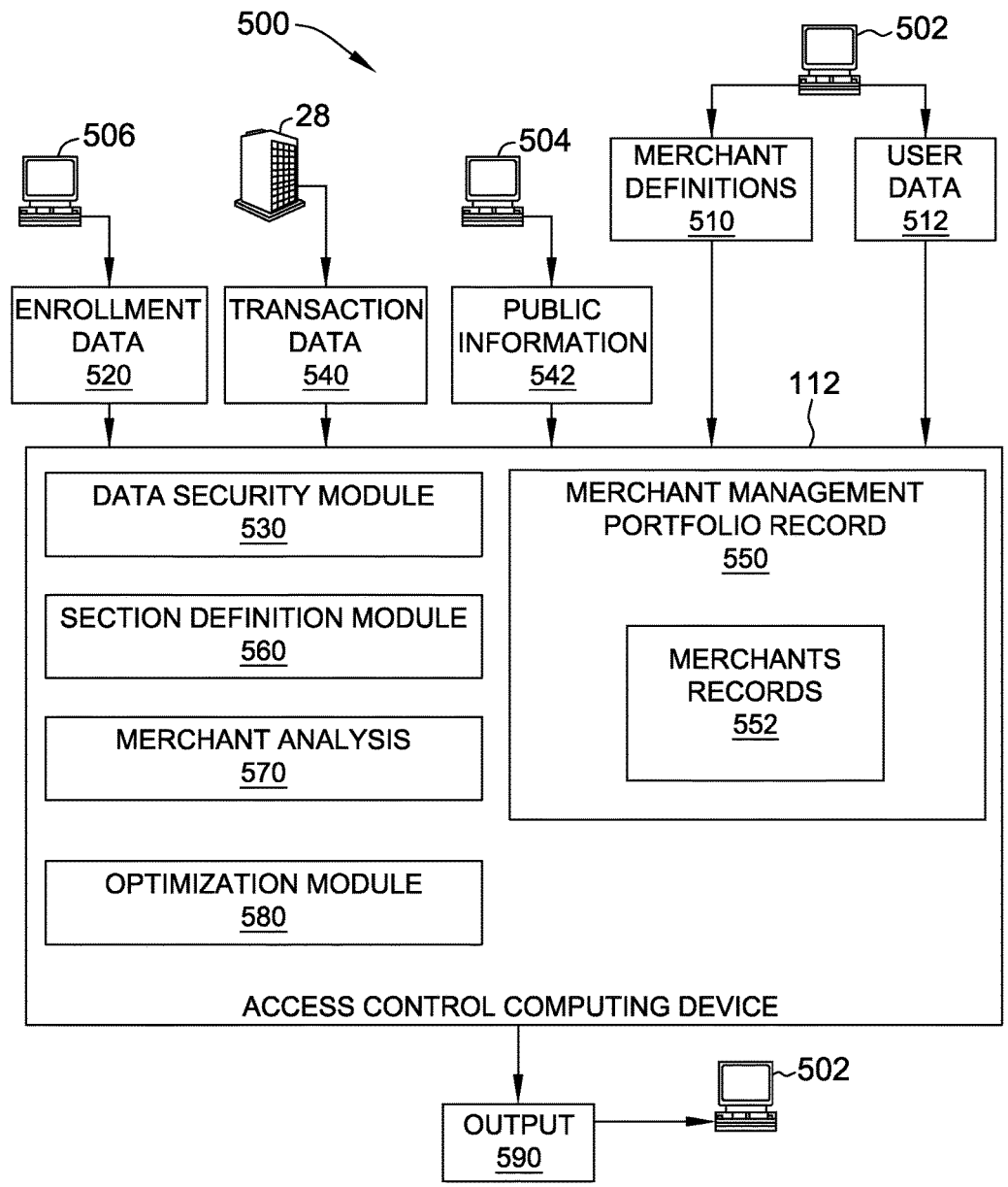

FIG. 5 is a simplified data flow diagram for generating aggregated merchant analytics for a sector or other data, controlling access to the data, and providing the data for display on a user interface using access control computing device 112. As described herein, access control computing device 112 receives merchant definitions 510 and user data 512 (such as investment goals) from a user device 502 (such as a commercial lender, a commercial owner, or a marketing director). Access control computing device 112 defines a plurality of merchant records 552 based on merchant definitions 510 in the Enrollment Phase as identified above and herein. Access control computing device 112 further defines merchant management portfolio record 550 based on such merchant definitions 510. Access control computing device 112 also receives enrollment data 520 from user device remote computing device 506 (e.g., a computing device operated by an administrative user). Alternatively, access control computing device 112 receives enrollment data 520 directly from a user. In some embodiments, enrollment data 520 includes an initial username, initial password, and initial code segment defining the geographic area for which the user desires access to corresponding data (e.g., merchant analytics for sectors within the geographic area). In further embodiments, enrollment data includes user data 512 and/or merchant definitions 510.

Access control computing device 112 also receives transaction data 540 associated with a plurality of merchants being analyzed. Transaction data 540 may be received from interchange network 28. Other information including census data or other public information 542 data may be received from external systems such as external server 504. For example, access control computing device 112 may receive geographic coordinates defining census blocks and/or other sectors from external server 504. In some embodiments, access control computing device 112 identifies merchants in transaction data 540 received from network 28 and determines if the merchant has already been assigned to a sector (e.g., by querying a database of merchants and/or sectors). If the merchant has been assigned to a sector, access control computing device 112 stores transaction data 540 or a part thereof in the database as associated with the corresponding sector. If the merchant has not already been assigned to a sector, access control computing device 112 retrieves a merchant address from or based on transaction data 540. Access control computing device 112 queries external server 504 with the merchant address and receives a census block identifier, geographic coordinates defining the census block, and/or other information corresponding to the census block which includes the merchant address. Access control computing device 112 uses this information to assign the merchant to a corresponding sector (e.g., census block or sector including the census block). If the sector is not already stored or defined, access control computing device 112 defines a new sector using the information received from external server 504 as described in the Data Generation Phase.

Access control computing device 112 includes a plurality of modules 530, 560, 570, and 580 that facilitate generation of merchant analytics or other data, access control to the data, and display of the data. Specifically, access control computing device 112 includes sector definition module 560 configured to define sectors and identify merchants located in each sector, as specified in the Data Generation Phase. Sector definition module 560 may update merchant records 552 to reflect the sector in which each associated merchant is located. Access control computing device 112 also includes merchant analysis module 570 configured to generate analytics for each merchant record 552 (or for each sector in which a merchant is located) in merchant management portfolio record 550, as specified in the Data Generation Phase. Access control computing device 112 also includes optimization module 580 configured to perform optimization tasks for merchant management portfolio record 550.

Optimization tasks may include sorting the merchant records in the portfolio according to the investment goals of a user. Some users may be responsible for or otherwise interested in a distribution of a marketing budget according to the investment goals, in some cases prioritizing growth or traffic or stability, as desired. If the user (a CMO, in this example, for illustrative purposes only) has a specific, predetermined budget and predetermined investment goals, the system may enable the CMO to distribute the budget based on the evaluation of all of the merchants in the CMO's portfolio. If, for example, the CMO chose to prioritize growth in his/her investment goals for his/her associated business, the system may sort the merchant location records in the portfolio from highest growth score to lowest growth score and may present the results as a list. Optimization tasks may also include providing recommendations for new locations for merchants using existing merchant records in a portfolio. In this example, a user (a real estate broker, for illustrative purposes only) may have received an offer from a merchant to rent (or lease) a merchant location (e.g., a property or a portion of a property). The merchant may have a particular sector in mind, or may have indicated in the offer that he/she desires a merchant location having certain specifications (e.g., a merchant location in a high-traffic sector). The real estate broker may import the specifications into the system, which may output an optimized portfolio to the real estate broker including sector records of sectors including available merchant locations having the specifications. Alternatively, the real estate broker may use the system to locate and/or suggest a sector other than the particular sector identified in the offer, by illustrating (using a user interface provided by the system) higher performance (e.g., higher traffic or higher growth) in a different sector. In another related example, the real estate broker may have an existing client complaining of poor performance at his/her merchant location. The real estate broker may illustrate (using the user interface provided by the system) slowing growth or traffic trends in the client's current sector, and may suggest relocation to a sector with higher recent performance.

Access control computing device 112 further includes data security module 530. Data security module 530 is configured to control access to the data generated in the Data Generation Phase as specified in the Data Display Phase. Security module 530 may further control the login process to the information services portal as specified in the Login Phase. For example, data security module 530 may be used to compare candidate login information received from user device 502 to a database of login information to ensure that the credentials of the candidate login information match those stored in the database of login information generated in the Enrollment Phase. Data security module 530 further retrieves from the database of login information a code segment associated with the username, the code segment defining a bounding area defining a geographic area for which the user is to be given access to data for sectors within the area. Data security module 530 is used to apply the bounding area, using the selected (e.g., retrieved) code segment, as described in the Data Display Phase. For example, data security module 530 compares the code segment to the sector definitions to determine which sectors are included in the area defined by the code segment. Data security module 530 may retrieve the sectors included in the area defined by the code segment and the corresponding values and use this retried information to cause a user device to display the values. In other words, data security module 530 applies a geographic restriction to the data set by processing the selected code segment.

Access control computing device 112 is also configured to provide outputs 590 as described herein. Outputs 590 include the data which access control computing device 112 retrieves during the Data Display Phase and to which the user has access. Specifically, outputs 590 may include merchant scores and/or analytics for each merchant for which there is an associated merchant record 552, as well as aggregated merchant scores and/or analytics for each sector. Outputs 590 may also include an optimized portfolio record 550, which may be sorted to identify and emphasize merchants that align with investment goals. Outputs 590 may also include any and all formatted output for display on a user interface of a user computing device (e.g., client system 114, as shown in FIG. 2). Outputs 590 may further include instructions generated by access control computing device 112 which, when received, cause user device 502 to display a UI (e.g., as displayed and described with reference to FIGS. 9-10 herein) based on and/or displaying merchant scores and/or analytics for each merchant for which there is an associated merchant record 552, aggregated merchant scores and/or analytics for each sector, an optimized portfolio record 550 which may be sorted to identify and emphasize merchants that align with investment goals, and/or other information as described herein.

Figure 6:
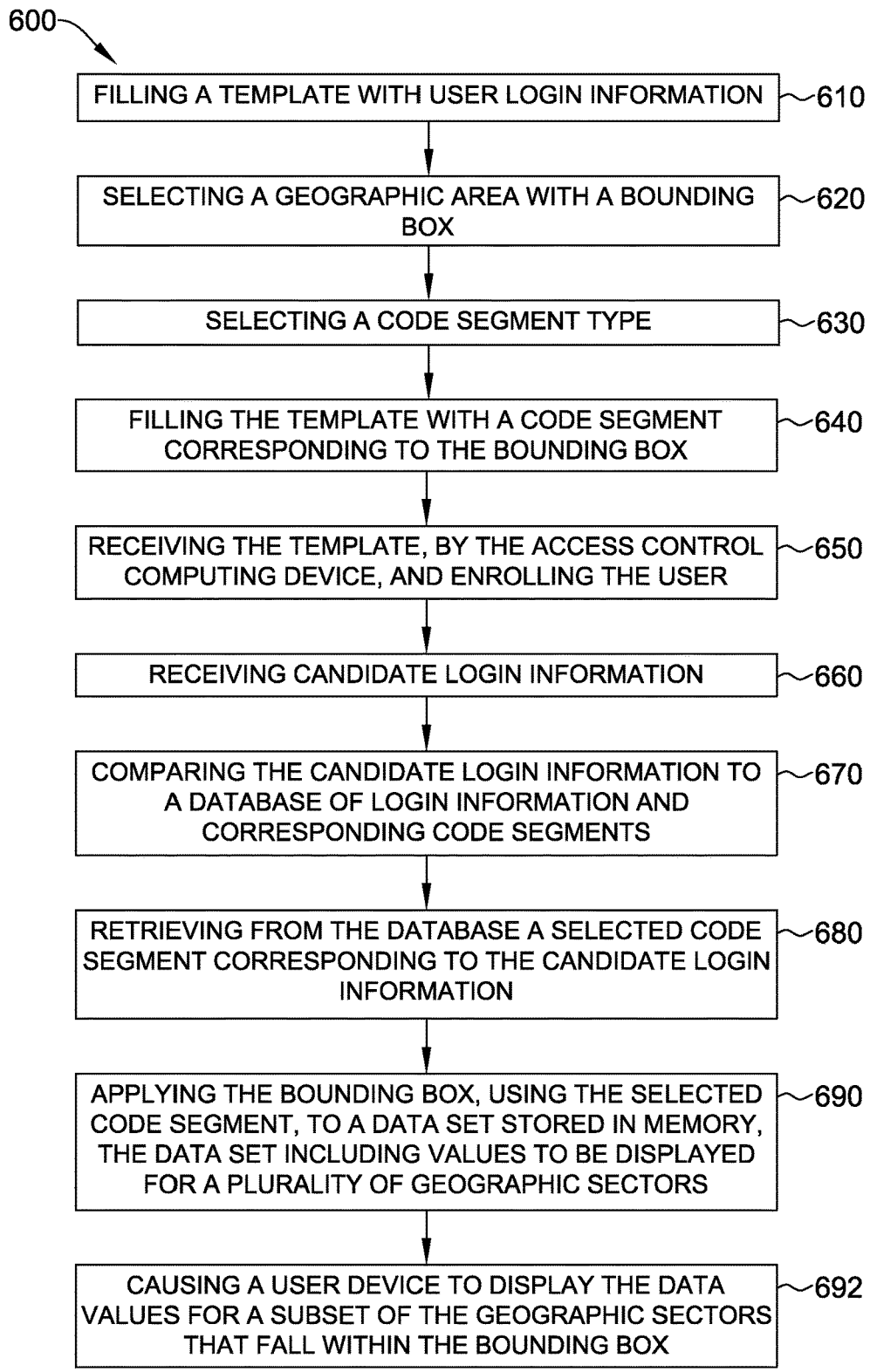

FIG. 6 is a simplified diagram of an example method 600 for generating merchant analytics for a sector or other data, controlling access to the data, and providing the data on a user interface using access control computing device 112 (shown in FIG. 2). Specifically, a user fills 610 a template with initial user login information (e.g., a username and password). The user selects 620 a geographic area with a bounding area (e.g., a bounding box). For example, the user uses a user interface element which displays a map and moveable bounding box. The user also selects 630 a code segment type for which a code segment is formatted corresponding to the bounding box. A user fills 640 the template with the code segment corresponding to the bounding area. For example, the user may copy the code segment displayed by the user interface element and paste the code segment into the template. The template may be provided on client system 114.

Access control computing device 112 receives 650 the template and enrolls the user. For example, client system 114 transmits the template to access control computing device 112. Access control computing device 112 enrolls the user based on the template and information included in the template as described in the Enrollment Phase. For example, access control computing device 112 determines that the information is unique and stores the information in a database of login information. Access control computing device 112 receives 660 candidate login information as a candidate login input. As described in the Login Phase, access control computing device 112 compares 670 the candidate login information of the candidate login input to the list of login entries and corresponding code segments. If a match is found (e.g., between usernames and corresponding passwords), access control computing device 112 retrieves 680 from the database of login information a selected code segment which corresponds to the candidate login information in the database of login information. As described in the Data Display Phase, access control computing device 112 applies 690 a geographic restriction (e.g., the bounding area defined area restriction), defined by the code segment and using the selected code segment, to a data set stored in memory. The data set includes the data values to be displayed for corresponding sectors. Access control computing device 112 applies the selected code segment to the data set to identify sectors which are included in the area defined by the code segment. The values for the sectors included in the area defined by the code segment are retrieved to be displayed (e.g., along with the sectors). The values may be merchant analytics for each sector. Access control computing device 112 causes 692 a user device to display the data values for a subset of the sectors that were determined to be within the area defined by the code segment and corresponding to the bounding area.

Figure 7:
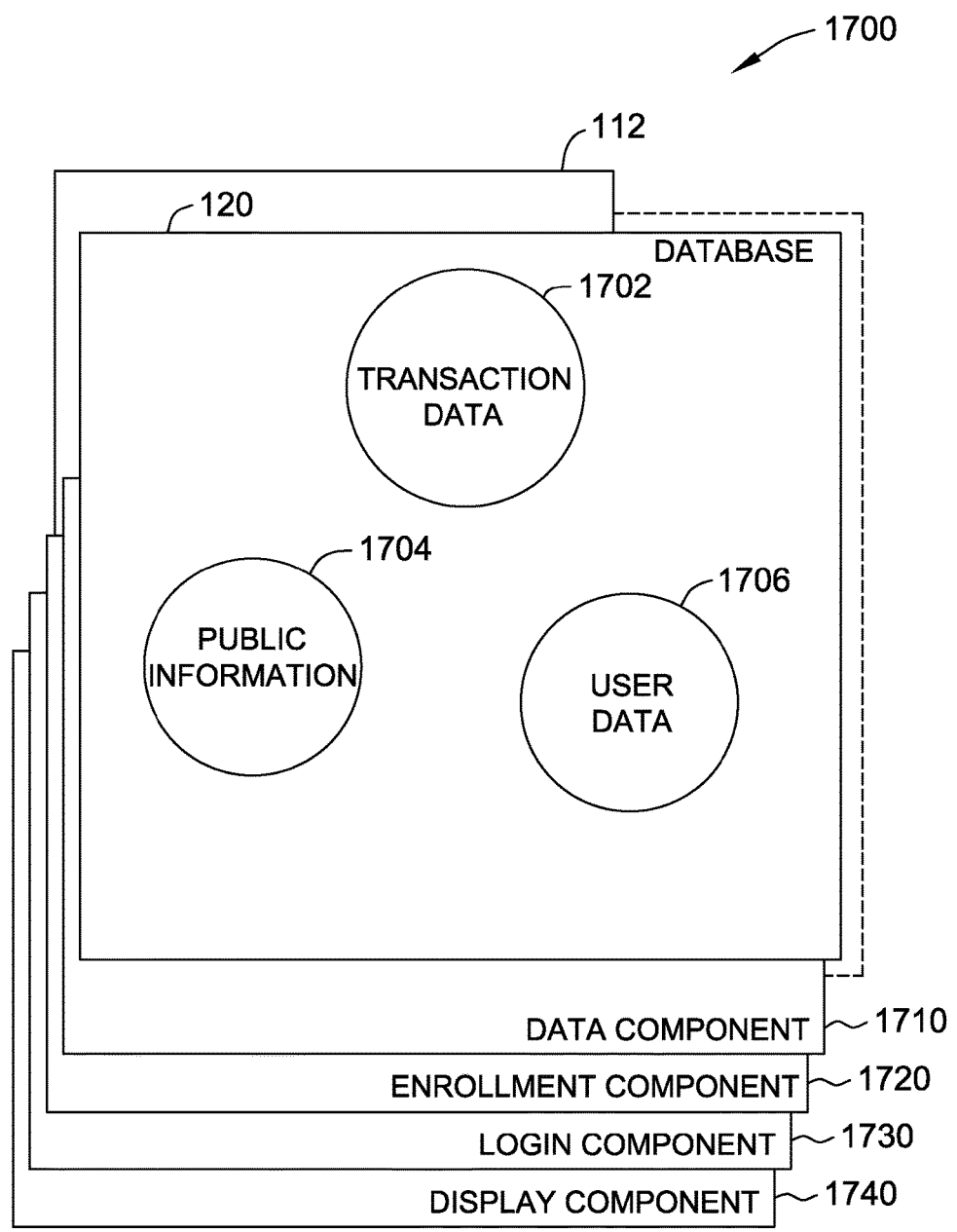

FIG. 7 is a diagram of components of one or more example computing devices that may be used in the environment shown in FIG. 2. FIG. 17 further shows a configuration of databases including at least database 120 (shown in FIG. 2). Database 120 may store information such as, for example, transaction data 1702, public information 1704, merchant analytics or other data to be displayed, user data 1706 (e.g., a database of login information) and/or other data. Database 120 is coupled to several separate components within access control computing device 112, which perform specific tasks.

Access control computing device 112 includes a data component 1710 for generating data according to the Data Generation Phase described herein. Data component 1710 may be used in defining a plurality of sectors of a geographic region. Additionally data component 1710 may be used for receiving transaction data for transactions occurring within a period of time. The transaction data is associated with a plurality of merchants, and the plurality of merchants are located in the geographic region. Data component 1710 may identify one sector of the plurality of sectors in which each merchant of the plurality of merchants is located. Data component 1710 may also be used in generating aggregated merchant analytics for each sector based on the transaction data associated with all merchants of the plurality of merchants located in the sector. The aggregated merchant analytics represent a ranking of each sector relative to all other sectors of the plurality of sectors.

In some implementations, data component 1710 (or any other component of access control computing device 112) may be further configured to calculate a growth of each sector using received transaction data for a subset of the plurality of merchants located in each corresponding sector. The growth represents a difference in total sales revenue in each sector from a beginning of the period of time to an end of the period of time. Data component 1710 may be further configured to determine a relative ranking for each sector by comparing the growth of each sector of the plurality of sectors and generate the growth score for each sector based on the relative ranking.

In some implementations, data component 1710 (or any other component of access control computing device 112) may be further configured to calculate a stability of each sector using received transaction data for a subset of the plurality of merchants located in each corresponding sector. The stability represents maintenance of total sales revenue within a range of values around an average value of the total sales revenue in each sector during the period of time. Data component 1710 may be further configured to determine a relative ranking for each sector by comparing the stability of each sector of the plurality of sectors, and generate the stability score for each sector based on the relative ranking.

In some implementations, data component 1710 (or any other component of access control computing device 112) may be further configured to calculate a size of each sector using received transaction data for a subset of the plurality of merchants located in each corresponding sector. The size represents a total sales revenue in each sector during the period of time. Data component 1710 may be further configured to determine a relative ranking for each sector by comparing the size of each sector of the plurality of sectors, and generate the size score for each sector based on the relative ranking.

In some implementations, data component 1710 (or any other component of access control computing device 112) may be further configured to calculate a traffic of each sector using received transaction data for a subset of the plurality of merchants located in each corresponding sector. The traffic represents a number of transactions initiated in each sector during the period of time. Data component 1710 may be further configured to determine a relative ranking for each sector by comparing the traffic of each sector of the plurality of sectors, and generate the traffic score for each sector based on the relative ranking.

In some implementations, data component 1710 (or any other component of access control computing device 112) may be further configured to calculate an average ticket size for each sector using received transaction data for a subset of the plurality of merchants located in each corresponding sector. The average ticket size represents an average transaction amount in each sector during the period of time, and the average ticket size may be calculated by dividing a total sales revenue for a sector by a number of transactions initiated in the sector during the period of time. Data component 1710 may be further configured to determine a relative ranking for each sector by comparing the average ticket size of each sector of the plurality of sectors, and generate the ticket size score for each sector based on the relative ranking.

In some implementations, data component 1710 (or any other component of access control computing device 112) may be further configured to generate a growth score for each sector. The growth score represents a first relative ranking of the plurality of sectors based on a difference in total sales revenue in each sector from a beginning of the period of time to an end of the period of time. Data component 1710 may also be configured to generate a stability score for each sector. The stability score represents a second relative ranking of the plurality of sectors based on a maintenance of a total sales revenue within a range of values around an average value of the total sales revenue in each sector during the period of time. Data component 1710 may be further configured to generate a size score for each sector. The size score represents a third relative ranking of the plurality of sectors based on the total sales revenue in each sector during the period of time. Data component 1710 may also be configured to generate a traffic score each sector. The traffic score represents a fourth relative ranking of the plurality of sectors based on a number of transactions initiated in each sector during the period of time. Data component 1710 may further be configured to generate a ticket size score for each sector. The ticket size score represents a fifth relative ranking of the plurality of sectors based on an average transaction amount in each sector during the period of time. Data component 1710 may still further be configured to generate the composite score for each sector. The composite score represents a sixth relative ranking of the plurality of sectors based on an aggregation of the growth score, the stability score, the size score, the traffic score, and the ticket size score of each sector.

Access control computing device 112 further includes enrollment component 1720 for enrolling users with access control computing device 112. Enrollment component 1720 receives initial user login information including a username, password, and code segment defining a bounding area (e.g., bounding box) which defines a geographic area of interest to the user. Enrollment component 1720 may also host or provide a template and/or user interface element for selecting a geographic area. A user uses the template and/or user interface element to provide the initial user login information to access control computing device 112. Enrollment component 1720 may determine that the login information is unique. Enrollment component 1720 stores the received login information in a database of login information (e.g., in database 120).

Access control computing device 112 includes login component 1730 for handling user logins to the information services portal hosted by or otherwise provided using access control computing device 112. Login component 1730 receives candidate login information from a user device. Login component 1730 compares the candidate login information to the database of login information and determines if the candidate login information (e.g., username and password) matches login information stored in the database of login information. If there is a match, login component 1730 retrieves from the database of login information a selected code segment.

Access control computing device 112 includes a display component 1740 for causing a user device to display data corresponding to sectors included within the area defined by the code segment. Display component 1740 uses the selected code segment retrieved by login component 1730 to determine which data values and which sectors to display to the user. Display component 1740 applies the selected code segment to a data set which includes sectors defined by geographic information and values (e.g., merchant analytics) associated with the sectors. For example, display component 1740 calls a function which compares the selected code segment to the geographic definition of the sectors and returns the sectors which are within the area define by the bounding area (e.g., bounding box) expressed by the selected code segment. Based on the returned sectors which are within the area defined by the selected code segment, display component 1740 retrieves values associated with those sectors. Display component 1740 causes a user device to display the values and/or sectors so identified. For example, display component 1740 may transmit instructions to the user device along with the values and sectors data which cause the user device to display the information (e.g., according to the example screenshots depicted in FIGS. 9-10).

Figure 8:
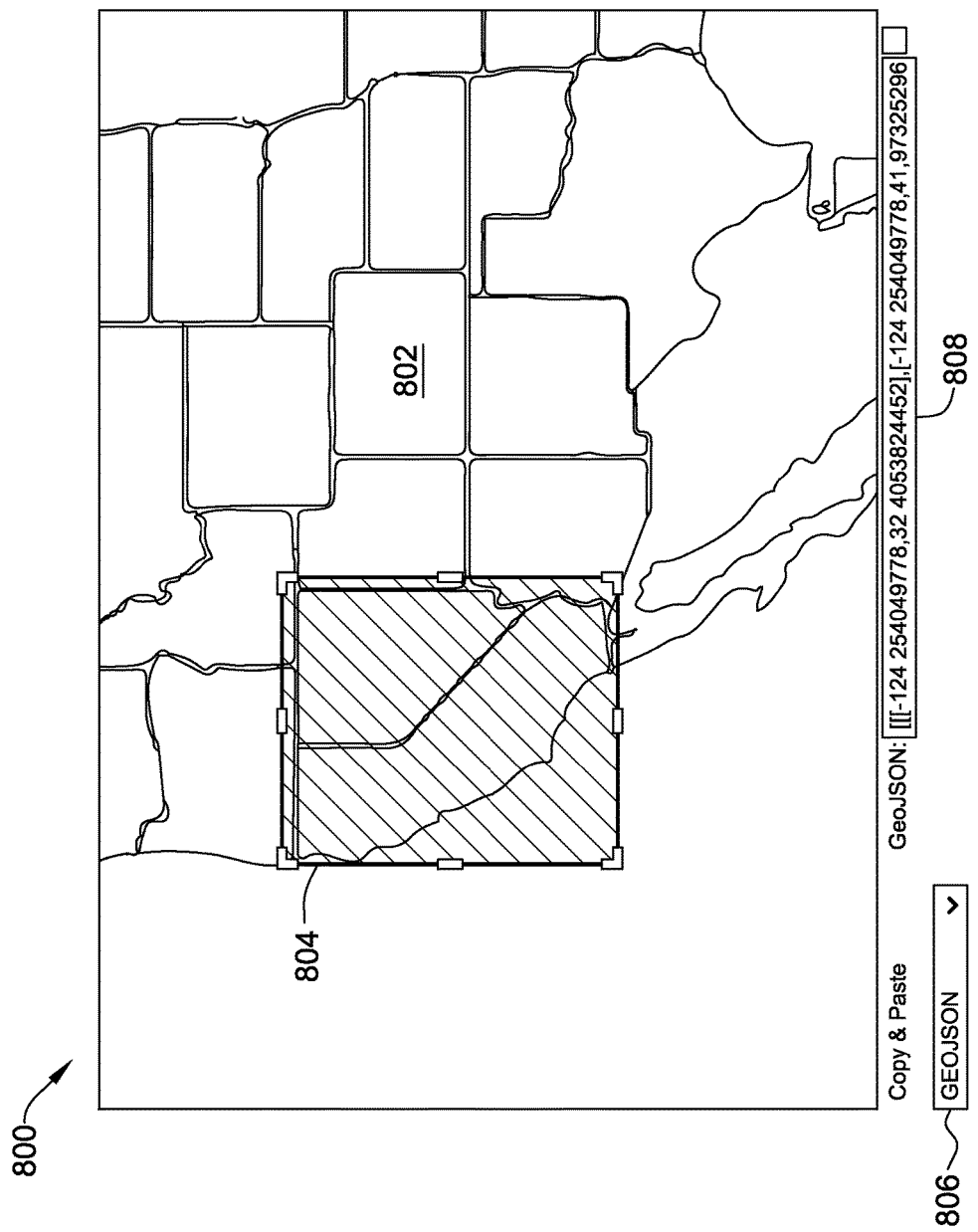

FIG. 8 is an example screenshot displayed on a user interface (e.g., user interface 118, shown in FIG. 2) of a user computing device (e.g., client system 114) showing an example user interface element 800 for enrolling a user with access control computing device 112 as described in the Enrollment Phase. User interface element 800 may be hosted by access control computing device 112, run as part of an enrollment system 122 residing in memory of a client system 114, or otherwise made accessible to a user. User interface element 800 includes a display of map 802. Map 802 may display geographic features, political divisions, and/or other information. Map 802 may be zoomed in and/or out by inputs to a user interface (e.g., user interface 118) which includes a display showing user interface element 800. User interface element 800 further includes bounding area 804. In some embodiments, bounding area 804 is rectangular (e.g., a bounding box) and can be resized or shaped by, for example, dragging a corner or edge of bounding area 804. In alternative embodiments, bounding area 804 may be one or more other shapes (e.g., a triangle, a trapezoid, other polygon or combination of polygons, a circle, an oval, and/or other shapes). User interface element 800 may include a plurality of bounding areas 804 to allow for the selection of non-adjacent areas. Bounding area 804 is resizable and positionable such that a user can place areas of interest within bounding area 804. Bounding area 804 is used in the Enrollment Phase to define the area(s) for which the user will be able to access corresponding data through access control computing device 112.

User interface element 800 further includes dropdown menu 806. Drop down menu 806 allows a user of user interface element 800 to select one of a plurality of code types for which a code segment defining bounding area 804 is generated by user interface element 800. Field 808 displays a code segment which defines bounding area 804 based on its relationship to map 802. The code segment is formatted based on the code type selected by dropdown menu 806. A user of user interface element 800 may use the code segment in field 808 to provide initial login information to access control computing device 112. For example, a user may copy the contents of filed 808 and paste the content into a field in a template which is later sent to access control computing device 112 as part of the Enrollment Phase described herein.

Figure 9:
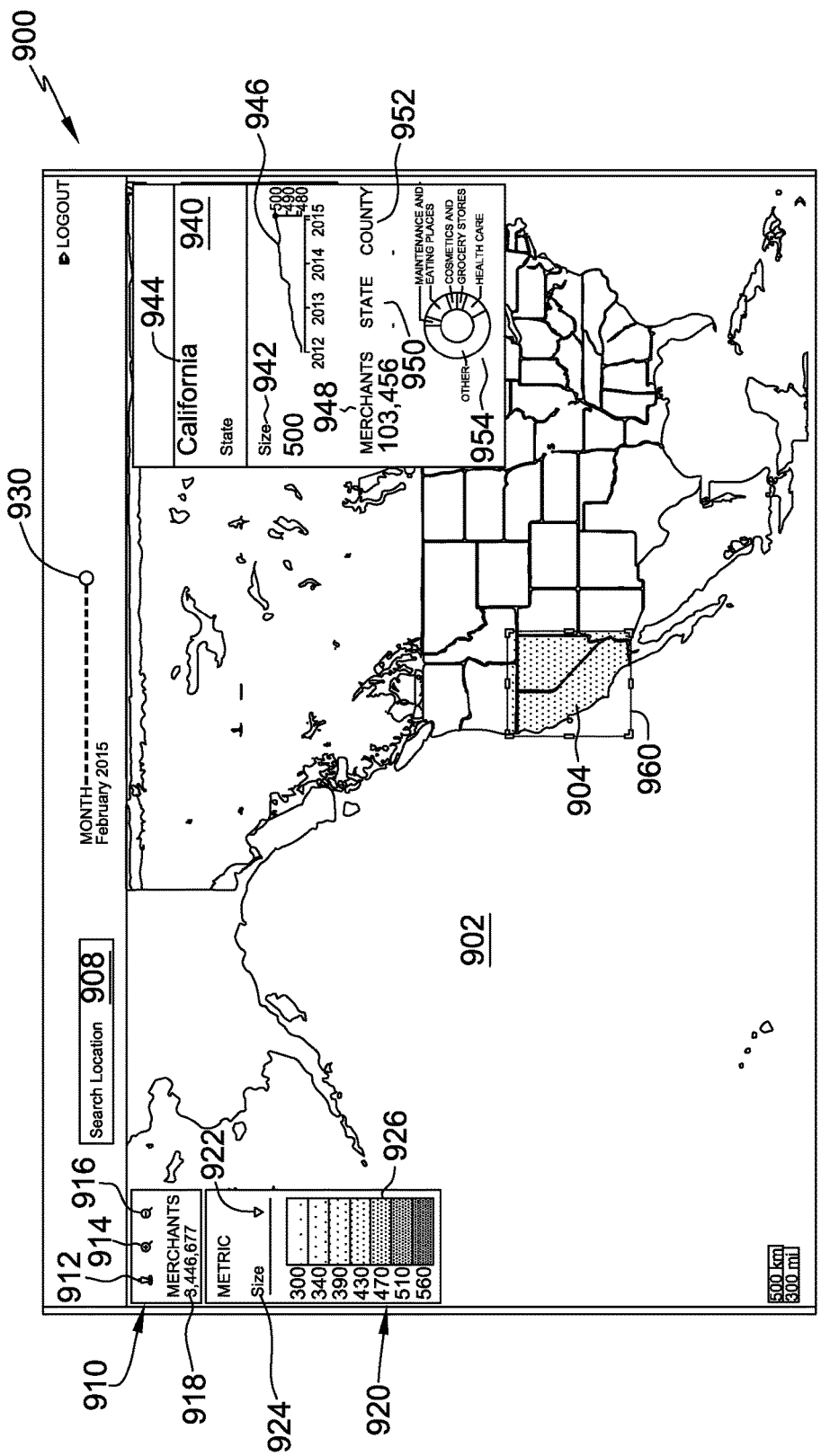
Figure 10:
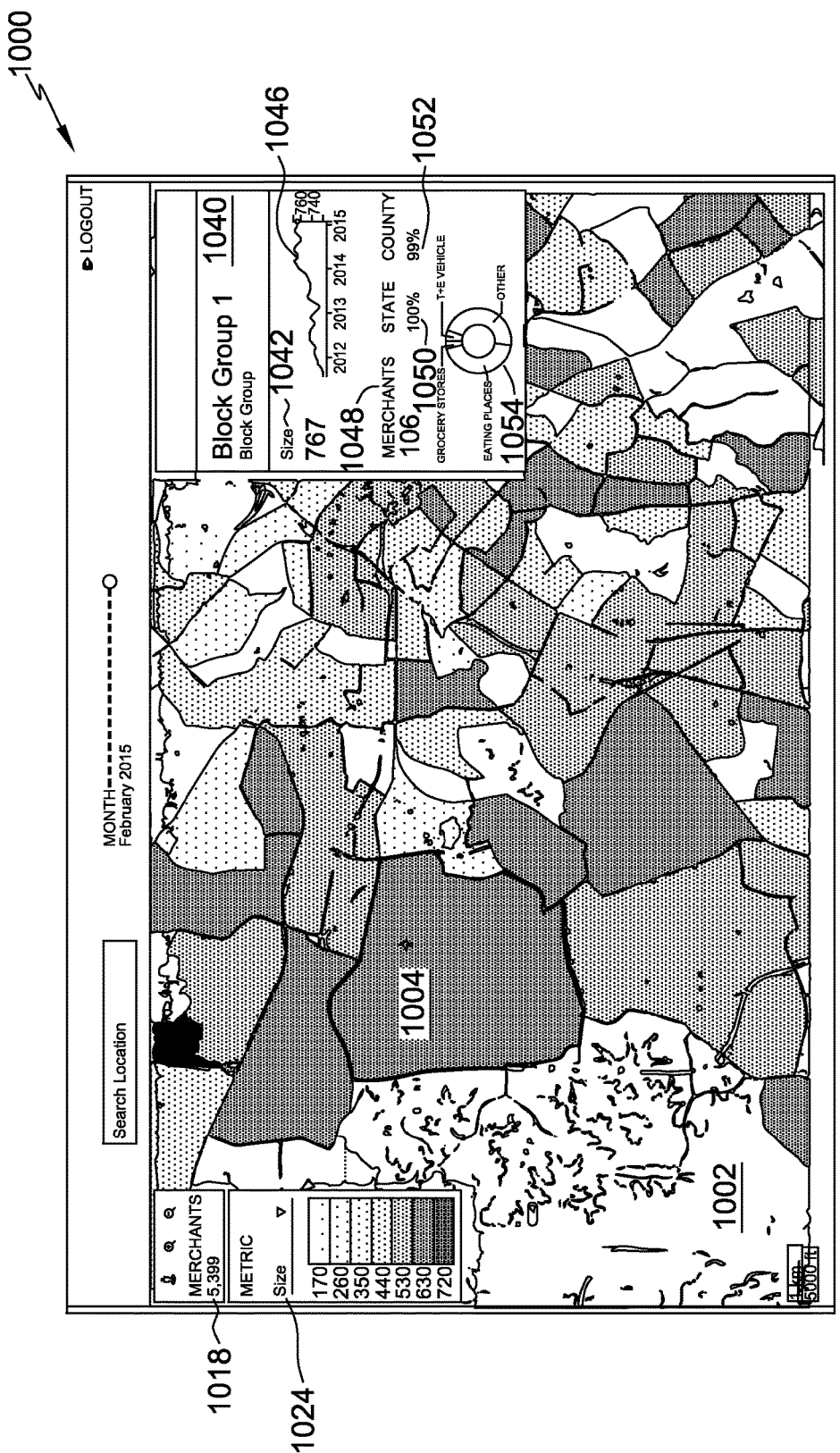

FIGS. 9-10 are example screenshots displayed on a user interface (e.g., user interface 118, shown in FIG. 2) of a user computing device (e.g., client system 114, also shown in FIG. 2). The example screenshots include data generated by access control computing device 112 (shown in FIG. 2) such as merchant analytics, as described herein. Access control computing device 112 communicates the merchant analytics to the user device for display on interactive user interface 118.

More specifically, FIG. 9 depicts a U.S.-level screenshot 900 showing a "zoomed out" view 902 of the United States of America. In view 902, the sectors are defined and displayed at a state-wide level. This may be an aggregation of census block sectors within each state. In alternative embodiments, smaller sectors are displayed. The screenshot 900 also includes several tools that enable a user to navigate the user interface and to examine the data generated and transmitted by access control computing device 112. For example, the screenshot 900 depicts a location search bar 908, which enables the user to search for a geographic region of interest. The screenshot 900 also includes a view navigation module 910. The view navigation module 910 includes a "view type" selectable icon 912, which enables the user to toggle between a "street map" view (as shown in view 902) and a "satellite" view (showing geographic features). The view navigation module 910 also includes "zoom out" 914 and "zoom in" 916 selectable icons. The view navigation module 910 further includes a merchant number indicator 918, which indicates the number of merchants encompassed by the current view (3,446,677 in view 902).

The screenshot 900 further includes a metric information module 920. The metric information module 920 allows the user to select between available merchant analytics metrics (e.g., Composite, Growth, Stability, Size, Traffic, and Ticket Size scores) using a drop-down menu 922. In the example embodiment, the metric information module 920 further includes a score scale 926, which provides an explanation to the user of the color-coding of the sectors. The sectors displayed in view 902 are shown "painted" with colors and/or shades corresponding to the score scale 926, which visually indicates the relative score (for the selected metric 924) for each sector. When a user chooses a different metric using drop-down menu 922, the user interface will "re-paint" (i.e., re-color or re-shade) the displayed sectors (and, in some cases, the score scale 926) to reflect a range of numerical scores according to the selected metric 924. In the example embodiment, a darker color indicates a higher score. In view 902, the selected metric 924 is "Size." Accordingly, the merchant analytics provided on the user interface are size scores for selected sectors.

Only sectors for which the user has access to the corresponding data are "painted." Sectors for which the user does not have access to the corresponding data may be identified (e.g., outline) but no corresponding data (e.g., shading or "painting") is displayed. In this example, bounding area 960 is shown in view 902. Bounding area 960 shows the boundaries of the area in which the user has access to data as determined by access control computing device 112. Bounding area 960 corresponds to bounding area 804 shown in FIG. 8 and used to enroll the user with access control computing device 112. In alternative embodiments, bounding area 960 is not displayed in view 902.

The screenshot 900 also depicts a "smart chart" 940, which provides the user with a score 942 for a selected sector 904, as well as additional information. In view 902, California is the selected sector 904, as indicated by the sector indicator 944 of the smart chart 940. The smart chart 940 includes, in view 902, a size score 942 for California (500 in view 902). As view 902 depicts sectors at a state level, the size score 942 for California is relative to all other states. The smart chart 940 also includes a trend graph 946, which is a visual representation of the size score trends for the selected sector 904 (California) over time. The smart chart 940 also includes its own merchant number indicator 948, which indicates the number of merchants included in the selected sector 904 (California). State and County ranking indicators 950, 952 in the current view 902, are blank, as they are not applicable to a state-level sector. State and County ranking indicators 950, 952 will be described further herein with respect to FIG. 10. The smart chart 940 also includes an industry chart 954 (a pie chart in the illustrated embodiment), which indicates the percentage of merchant locations in the selected sector 904 associated with various industries.

FIG. 10 depicts a screenshot 1000 showing a view 1002 that is zoomed-in relative to view 902 (shown in FIG. 9). View 1002 is within the geographic area to which the user has access to the data. Therefore, all sectors are shaded to display the corresponding data. View 1002 depicts a portion of a county at block-group-level sectors. In view 1002, "Block Group 1" is the selected sector 1004. Block group 1 may correspond to a census block. The merchant number indicator 1018 has decreased, and the information in the smart chart 1040 has changed. The size score 1042 (now 767), trend graph 1046, merchant number indicator 1048, state ranking indicator 1050, and industry chart 1054 reflect data representative of Block Group 1. Moreover, the county ranking indicator 1052 is now populated. The county ranking indicator 1052 denotes the percentile of the selected sector 1004 relative to all sectors in the county. In view 1002, the county ranking indicator 1052 reads 99%, denoting that Block Group 1 is in the $99^{th}$ percentile of block-group-level sectors in the county, according to the selected metric 1024 of "size."

This written description describes storing information as tuples. It should be understood that this is an exemplary embodiment. Tuples may include string entries, numerical entries, file location entries, files storing a plurality of information, pages, and/or other entries. In alternative embodiments, other database storage techniques may be used in place of, or in combination with, the use of tuples. For example, information may be stored in a database using a B+ tree structure, unordered structure, ordered structure, heap files structure, hash buckets structure, and/or other structure. Information may be stored such that entries of information are linked by any type of relationship corresponding to entries in the same tuple as described herein.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

In addition, although various elements of the access control computing device are described herein as including general processing and memory devices, it should be understood that the access control computing device is a specialized computer configured to perform the steps described herein for generating and displaying aggregated merchant analytics for a sector, as well as identifying an impact event using the aggregated merchant analytics.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for controlling access by a remote computing device associated with a user to a data set stored in a memory, the data set including values for a geographic region, said method implemented by an access control computing device including at least one processor in communication with the memory, the access control computing device in communication with the remote computing device, said method comprising:
    filling a set of template data fields with login information including a username and a password;
    selecting a geographic area from a map using a resizable and positionable bounding area overlaid on the map;
    selecting a code segment type;
    receiving, by the access control computing device, the selection of the geographic area corresponding to the user, the geographic area included in the geographic region;
    generating, by the access control computing device, a code segment having the selected code segment type and defining the geographic area, wherein the code segment enables access to a data subset of the data set, the data subset including values for the geographic area, wherein the code segment restricts access to the data set for values outside the geographic area, and wherein the code segment is used to apply a geographic restriction corresponding to the geographic area selected from the map using the resizable and positionable bounding area;
    filling a second template data field with the generated code segment;
    providing the second template data field to the access control computing device;
    assigning, by the access control computing device, the code segment to a login entry of a list of login entries, wherein the login entry is associated with the user, the code segment being assigned prior to the associated user accessing the data set;
    storing, by the access control computing device, the login entry;
    receiving, by the access control computing device from the remote computing device, a candidate login input corresponding to the user;
    accessing, by the access control computing device, the list of login entries;
    comparing, by the access control computing device, the candidate login input to the list of login entries stored in the memory;
    matching, by the access control computing device, the candidate login input to the login entry of the list of login entries stored in the memory to confirm that the user is authorized to access the data set stored within the memory;
    retrieving, by the access control computing device, from the memory the code segment associated with the login entry, the code segment defining the geographic area included within the geographic region;
    applying, by the access control computing device, the geographic restriction of the code segment to the data set by processing the code segment by the access control computing device; and
    transmitting, by the access control computing device, the data subset of the data set to the remote computing device for display, the data subset including values for only the geographic area.

2. The method of claim 1, further comprising:
    receiving initial login information corresponding to the user, the initial login information including an initial username and an initial password;
    receiving an initial code segment defining an initial geographic area associated with the initial login information, the initial code segment used to apply an initial geographic restriction for restricting access to an initial data subset of the data set that includes values for the initial geographic area defined by the initial code segment; and
    enrolling the user by storing the initial login information and the initial code segment in the memory and as entries in the list of login entries.

3. The method of claim 2, wherein the initial login information and the initial code segment are received by the access control computing device from a remote computing device in communication with the access control computing device.

4. The method of claim 1, wherein applying the geographic restriction comprises:
    comparing location data of the code segment to location data associated with the geographic region;
    determining that the location data of the code segment includes at least one geographic sector that is included within the geographic area defined by the code segment; and retrieving, from the data set, values associated with the at least one geographic sector and providing the values of the at least one geographic sector to the remote computing device.

5. The method of claim 1, wherein the values of the data set are aggregated merchant analytics for a plurality of geographic sectors included within the geographic region.

6. The method of claim 5, wherein the aggregated merchant analytics for the plurality of geographic sectors are generated based on transaction data associated with a plurality of merchants located in each geographic sector, wherein the aggregated merchant analytics represent a ranking of each geographic sector relative to all other geographic sectors.

7. An access control computing device for controlling access by a remote computing device associated with a user to a data set stored in a memory, the data set including values for a geographic region, said access control computing device comprising at least one processor in communication with the memory, the access control computing device in communication with the remote computing device, said at least one processor programmed to:
fill, at the remote computing device, a set of template data fields with login information including a username and a password;
select, at the remote computing device, a geographic area from a map using a resizable and positionable bounding area overlaid on the map;
select, at the remote computing device, a code segment type;
receive the selection of the geographic area corresponding to the user, the geographic area included in the geographic region;
generate a code segment having the selected code segment type and defining the geographic area, wherein the code segment enables access to a data subset of the data set, the data subset including values for the geographic area, wherein the code segment restricts access to the data set for values outside the geographic area, and wherein the code segment is used to apply a geographic restriction corresponding to the geographic area selected from the map using the resizable and positionable bounding area;
assign the code segment to a login entry of a list of login entries, wherein the login entry is associated with the user, the code segment being assigned prior to the associated user accessing the data set;
fill, at the remote computing device, a second template data field with the generated code segment;
provide, by the remote computing device, the second template data field to the access control computing device;
store the login entry;
receive a candidate login input corresponding to the user from the remote computing device;
access the list of login entries including an associated code segment for each login entry;
compare the candidate login input to the list of login entries stored in the memory;
match the candidate login input to the login entry of the list of login entries stored in the memory to confirm that the user is authorized to access the data set stored within the memory;
retrieve from the memory the code segment associated with the login entry, the code segment defining the geographic area included within the geographic region;
apply the geographic restriction of the code segment to the data set by processing the code segment by the access control computing device; and
transmit the data subset of the data set to the remote computing device for display, the data subset including values for only the geographic area.

8. The access control computing device of claim 7, wherein said at least one processor is further programmed to:
receive initial login information corresponding to the user, the initial login information including an initial username and an initial password;
receive an initial code segment defining an initial geographic area associated with the initial login information, the initial code segment used to apply an initial geographic restriction for restricting access to an initial data subset of the data set that includes values for the initial geographic area defined by the initial code segment; and
enroll the user by storing the initial login information and the initial code segment in the memory and as entries in the list of login entries.

9. The access control computing device of claim 8, wherein said at least one processor are further programmed to receive the initial login information and the initial code segment from a remote computing device in communication with the access control computing device.

10. The access control computing device of claim 7, wherein said at least one processor is further programmed to:
compare location data of the code segment to location data associated with the geographic region;
determine that the location data of the code segment includes at least one geographic sector that is included within the geographic area defined by the code segment; and
retrieve, from the data set, values associated with the at least one geographic sector and providing the values of the at least one geographic sector to the remote computing device.

11. The access control computing device of claim 7, wherein the values of the data set are aggregated merchant analytics for a plurality of geographic sectors included within the geographic region.

12. The access control computing device of claim 11, wherein the at least one processor is further programmed to generate the aggregated merchant analytics for the plurality of geographic sectors based on transaction data associated with a plurality of merchants located in each geographic sector, wherein the aggregated merchant analytics represent a ranking of each geographic sector relative to all other geographic sectors.

13. A non-transitory computer-readable storage medium having computer-executable instructions embodied thereon for controlling access by a remote computing device associated with a user to a data set stored in a memory, the data set including values for a geographic region, wherein when said computer-executable instructions are executed by an access control computing device including at least one processor in communication with the memory, the computer-executable instructions cause the access control computing device to:
fill, at the remote computing device, a set of template data fields with login information including a username and a password;

select, at the remote computing device, a geographic area from a map using a resizable and positionable bounding area overlaid on the map;
select, at the remote computing device, a code segment type;
receive the selection of the geographic area corresponding to the user, the geographic area included in the geographic region;
generate a code segment having the selected code segment type and defining the geographic area, wherein the code segment enables access to a data subset of the data set, the data subset including values for the geographic area, wherein the code segment restricts access to the data set for values outside the geographic area, and wherein the code segment is used to apply a geographic restriction corresponding to the geographic area selected from the map using the resizable and positionable bounding area;
assign, the code segment to a login entry of a list of login entries, wherein the login entry is associated with the user, the code segment being assigned prior to the associated user accessing the data set;
fill, at the remote computing device, a second template data field with the generated code segment;
provide, by the remote computing device, the second template data field to the access control computing device;
store the login entry;
receive a candidate login input corresponding to the user from the remote computing device;
access the list of login entries including an associated code segment for each login entry;
compare the candidate login input to the list of login entries stored in the memory;
match the candidate login input to the login entry of the list of login entries stored in the memory to confirm that the user is authorized to access the data set stored within the memory;
retrieve from the memory the code segment associated with the login entry, the code segment defining the geographic area included within the geographic region;
apply the geographic restriction of the code segment to the data set by processing the code segment by the access control computing device; and
transmit the data subset of the data set to the remote computing device for display, the data subset including values for only the geographic area.

14. The non-transitory computer-readable storage medium of claim 13, wherein the computer-executable instructions further cause the access control computing device to:

receive initial login information corresponding to the user, the initial login information including an initial username and an initial password;

receive an initial code segment defining an initial geographic area associated with the initial login information, the initial code segment used to apply an initial geographic restriction for restricting access to an initial data subset of the data set that includes values for the initial geographic area defined by the initial code segment; and enroll the user by storing the initial login information and the initial code segment in the memory and as entries in the list of login entries.

15. The non-transitory computer-readable storage medium of claim 14, wherein the computer-executable instructions further cause the access control computing device to receive the initial login information and the initial code segment from a remote computing device in communication with the access control computing device.

16. The non-transitory computer-readable storage medium of claim 13, wherein the computer-executable instructions further cause the access control computing device to:

compare location data of the code segment to location data associated with the geographic region;

determine that the location data of the code segment includes at least one geographic sector that is included within the geographic area defined by the code segment; and retrieve, from the data set, values associated with the at least one geographic sector and providing the values of the at least one geographic sector to the remote computing device.

17. The non-transitory computer-readable storage medium of claim 13, wherein the values of the data set are aggregated merchant analytics for a plurality of geographic sectors included within the geographic region.

18. The non-transitory computer-readable storage medium of claim 17, wherein the computer-executable instructions further cause the access control computing device to generate the aggregated merchant analytics for the plurality of geographic sectors based on transaction data associated with a plurality of merchants located in each geographic sector, wherein the aggregated merchant analytics represent a ranking of each geographic sector relative to all other geographic sectors.

* * * * *